(12) United States Patent
Iwata

(10) Patent No.: US 7,044,462 B2
(45) Date of Patent: May 16, 2006

(54) FIXTURE

(75) Inventor: Kazuhide Iwata, Mino (JP)

(73) Assignee: Kabushiki Kaisha Imao Corporation, Gifu-ken (JP)

( * ) Notice: Subject to any disclaimer, the term of this patent is extended or adjusted under 35 U.S.C. 154(b) by 161 days.

(21) Appl. No.: 10/836,046

(22) Filed: Apr. 30, 2004

(65) Prior Publication Data

US 2005/0056985 A1 Mar. 17, 2005

(30) Foreign Application Priority Data

May 2, 2003 (JP) .................................. 2003-127593

(51) Int. Cl.
*B27G 15/00* (2006.01)

(52) U.S. Cl. .................... 269/309; 269/289 R; 269/157
(58) Field of Classification Search ......... 269/309–310, 269/289 R, 20, 24, 93–95, 50, 91, 157
See application file for complete search history.

(56) References Cited

U.S. PATENT DOCUMENTS

| 3,498,653 | A |   | 3/1970  | McCreery       |         |
|-----------|---|---|---------|----------------|---------|
| 4,135,418 | A |   | 1/1979  | McCray et al.  |         |
| 5,662,317 | A | * | 9/1997  | Beakes et al.  | 269/58  |
| 6,527,266 | B1| * | 3/2003  | Yonezawa et al.| 269/309 |
| 6,755,409 | B1| * | 6/2004  | Yonezawa       | 269/309 |
| 2004/0207141 | A1 | * | 10/2004 | Kuroda   | 269/309 |
| 2005/0029728 | A1 | * | 2/2005  | Kuroda   | 269/309 |

FOREIGN PATENT DOCUMENTS

| JP | 9-285925    | 11/1997 |
| JP | 11-19836    | 1/1999  |
| JP | 2001-157937 | 6/2001  |
| JP | 2001-225236 | 8/2001  |
| JP | 2003-039264 | 2/2003  |
| JP | 2003-097519 | 4/2003  |

OTHER PUBLICATIONS

Published Oct. 2002 Copy of Catalog "Q–. . . " pp. 1–4.
Published Mar. 2002 Copy of Catalog "KPCS/. . . " pp. 1–7.
Published Jan. 2004 Copy of catalog "Pascal Pal System" pp. 1–10.

* cited by examiner

*Primary Examiner*—Lee D. Wilson
(74) *Attorney, Agent, or Firm*—Jordan and Hamburg LLP

(57) ABSTRACT

A fixture 3 for fixing an article to be fixed, such as a workpiece 2, to a fixture base 1 comprises a fixture body 5 detachably mountable on a mounting object, such as the fixture base 1. A linking member 4 is detachably mountable on the workpiece 2. The fixture body 5 comprises a body section 6 comprising an insertion hole 12 into which the linking member 4 is to be inserted, a rotary section 7 which is rotatably fitted onto the body section 6 so as to cover an outer peripheral portion 6*b* thereof, and a ball 8*a* protruding into the insertion hole 12 via a through hole 13 formed in the body section 6 for engagement with the linking member 4. Furthermore, a pushing portion 19 which causes the ball 8*a* to protrude into the insertion hole 12 when the rotary section 7 is moved in one of axial directions thereof is provided at the inner surface 7*c* of the rotary section 7.

12 Claims, 21 Drawing Sheets

FIXTURE

BACKGROUND OF THE INVENTION

1. Field of the Invention

The present invention relates to a fixture for fixing an article to be fixed, such as a workpiece, to a mounting object such as a fixture base or an MC pallet.

2. Background Art

A fixture shown in FIG. 21 (first fixture) is an example of a conventional fixture for mounting a workpiece on a mounting object such as a fixture base, an MC pallet, or a machine table, and fixing the workpiece thereto, while allowing access to surfaces other than the mounting surface of the workpiece. This fixture 40 was composed of a bolt 41 which is to be screwed into the lower surface serving as a mounting surface of a workpiece 45 and a body section 42 mounted on the mounting object 46. The body section 42 had a three-sided square shape in the longitudinal section, and the upper wall thereof was provided with a notch 43 for inserting the bolt 41. Further, the workpiece 45 was fixed to a plurality of body sections 42, 42 mounted on the aforementioned mounting object 46 by setting the workpiece 45 so that the female threaded portion 44 provided on the lower surface thereof was positioned above the notch 41, inserting the bolt 41 from below the notch 43, and screwing it into the female threaded portion 44 of the workpiece 45.

Another fixture (second fixture) was described in Laid-open Japanese Patent Application No. H9-285925 (FIG. 1 and FIG. 4). Thus, in this fixture, a ring-like drive member was inserted, so that it could move in the axial direction, in a portion close to the lower end of a guide hole opened at the upper end of a housing, and a transmission sleeve was inserted into a cylindrical hole of the drive member. This transmission sleeve was driven toward the lower end by the drive member and also was impelled upward by restoration means. Further, an operation tool was inserted into the upper end portion of the guide opening. By means of movement in the axial direction of the transmission sleeve with respect to this operation tool, this operation tool could switch an engagement tool supported in the upper end portion of the transmission sleeve between a position of engagement with the engagement portion of a clamp rod inserted in the cylindrical hole of the transmission sleeve and a position of disengagement from the engagement portion.

Then, a housing was mounted on a workpiece pallet, and a clamp rod was mounted on a workpiece. Here, the clamp rod was inserted into the housing and lowered. When the transmission sleeve was driven down by the drive member, the engagement tool was switched to the engagement position and engaged with the engagement portion of the clamp rod. As a result, the drive force of the drive member was transmitted to the workpiece via the transmission sleeve, engagement tool, and clamp rod in the order of description and the workpiece was mounted on the workpiece pallet and fixed thereto.

SUMMARY OF THE INVENTION

In the above-described first fixture, the bolts 41 had to be screwed with a tool after the workpiece 45 has been set on the upper portion of the fixture, and this was a very troublesome and time-consuming operation.

In the second fixture, the above-described drawbacks have been overcome, but a hydraulic fluid such as oil was used to hold the engagement tool and clamp rod in the engaged state, that is, to hold the drive member in a state in which it was driven down. For this reason, this fixture had a large structure and was expensive.

The present invention was created to resolve the above-described conventional problems and it is an object of the present invention to provide a fixture which has a simple structure and can easily fix an article to be fixed, such as a workpiece, to a mounting object by manual operations.

A fixture in accordance with the present invention is provided with the following structure in order to attain the above-described object.

Thus, a fixture of the invention ("Embodiment 1") is a fixture for fixing an article to be fixed, to a mounting object via a linking member provided on the article to be fixed, this fixture comprising a fixture body detachably mounted on the mounting object. Here, the fixture body comprises a body section having formed therein an insertion hole into which the linking member is to be inserted, a rotary section which is rotatably fitted onto the body section so as to cover an outer peripheral portion thereof, and an engagement member protruding into the insertion hole via a through hole formed in the outer peripheral portion of the body section for engagement with the linking member. Further, a pushing portion which pushes the engagement member so as to cause it to protrude into the insertion hole, following the rotation of the rotary section thereof, is provided at the inner surface of the rotary section.

With such a fixture, first, the fixture body is mounted on the mounting object and then the linking member provided at the article to be fixed is inserted into the insertion hole of the body section in the fixture body. If the rotary section is then rotated, the pushing portion provided on the inner surface of the rotary section pushes the engagement member so that it protrudes into the insertion hole. The engagement member that was thus pushed protrudes into the insertion hole and engages with the linking member. Therefore, a pushing force of the pushing portion is applied to the linking member via the engagement member and the linking member is fixed to the fixture body, thereby fixing the article to the mounting object.

Another fixture of the invention ("Embodiment 2") is a fixture for fixing an article to be fixed, to a mounting object, this fixture comprising a fixture body detachably mounted on the mounting object and a linking member detachably mounted on the article to be fixed. Here, the fixture body comprises a body section having formed therein an insertion hole into which the linking member is to be inserted, a rotary section which is rotatably fitted onto the body section so as to cover the outer peripheral portion thereof, and an engagement member protruding into the insertion hole via a through hole formed in the outer peripheral portion of the body section for engagement with the linking member. Further, a pushing portion which pushes the engagement member so as to cause it to protrude into the insertion hole, following the rotation of the rotary section thereof, is provided at the inner surface of the rotary section.

With such a fixture, the fixture body is mounted on the mounting object and then the linking member is mounted on the article to be fixed. Here, the linking member is inserted into the insertion hole of the body section in the fixture body. If the rotary section is then rotated, the pushing portion provided on the inner surface of the rotary section pushes the engagement member so that it protrudes into the insertion hole. The engagement member that was thus pushed protrudes into the insertion hole and engages with the linking member. Therefore, a pushing force of the pushing portion is applied to the linking member via the engagement member and the linking member is fixed to the fixture body, thereby fixing the article to the mounting object.

It is preferred that the engagement member be engaged with the linking member so that a pull-out force acting in the lengthwise direction of the insertion hole is applied to the linking member ("Embodiment 3"). In such a case, because a pull-out force acting in the lengthwise direction of the insertion hole is applied to the linking member by the engagement member, the linking member is strongly fixed to the fixture body.

It is preferred that the distal end surface of the body section protrude to the outside beyond the distal end surface of the rotary section ("Embodiment 4"). In such a case, the article to be fixed is not in contact with the distal end surface of the rotary section.

The fixture body may comprise a transmission element for causing the rotary section to move in the axial direction thereof following the rotation of the rotary section, and the pushing portion may push the engagement member so that it is caused to protrude into the insertion hole, as the rotary section moves in one of the axial directions thereof ("Embodiment 5"). In such a case, the rotary section is moved in the axial direction via the transmission element, as the rotary section rotates. Furthermore, the pushing portion causes the engagement member to protrude into the insertion hole by means of the movement of the rotary section in one of its axial directions.

The transmission element may be composed of a male threaded portion provided at the body section and a female threaded portion which is provided in the rotary section for engagement with the male threaded portion ("Embodiment 6"). In such a case, the engagement of the male threaded portion and female threaded portion causes the rotary section to move in the axial direction thereof.

The transmission element may be composed of a guiding surface provided on any one of the body section and the rotary section and a guided protrusion which is provided on the other of the two and is guided with respect to the guiding surface ("Embodiment 7"). In such a case, the rotary section moves in the axial direction thereof because the guided protrusion is guided and moved along the guided surface.

The engagement member may comprise a ball, and the pushing portion may comprise an inclined surface which is inclined so as to withdraw from the axis along one of the axial directions ("Embodiment 8"). In such a case, if the rotary section is rotated and moved in one direction of the axial directions thereof, the inclined surface similarly moves in one direction of the axial directions and pushes and moves the engagement member toward the insertion hole. At this time, because the engagement member is a ball, the engagement member moves smoothly inside the through hole, protrudes into the insertion hole and reliably engages with the linking member.

A protruding portion for insertion into a positioning hole provided in the mounting object may be formed in the bottom surface portion of the body section ("Embodiment 9"). In such a case, the fixture body is positioned with respect to the mounting object by inserting the protruding portion into the positioning hole of the mounting object.

An air release hole linked to the insertion hole and passing so as to open at the bottom surface side of the body section is preferably formed in the body section ("Embodiment 10"). In such a case, the air present inside the insertion hole is released to the outside of the body section via the air release hole when the linking member is inserted into the insertion hole.

A base portion extended as a flange may be provided at the body section, and the fixture body may be detachably mounted on the mounting object with a threaded member passing into the base portion ("Embodiment 11"). In such a case, the fixture body is fixed to the mounting object with the threaded member.

An operation member for manual rotary operation is preferably mounted on the rotary section ("Embodiment 12").

As will be seen from the drawings and detailed description, there are yet other features applicable to or embodiments of the present invention.

Figure 1:
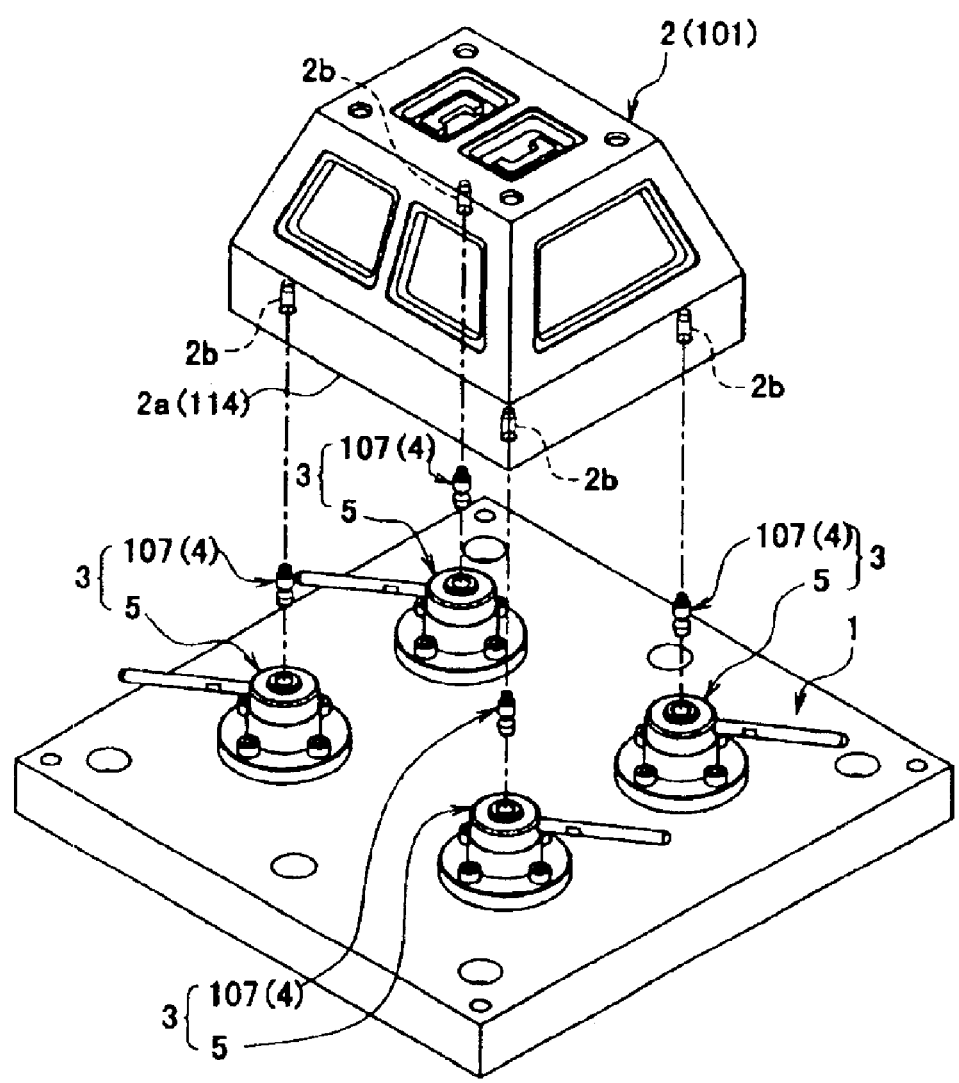
FIG. 1 is a perspective view illustrating an example of use of the first embodiment of the fixture in accordance with the present invention.
Figure 2:
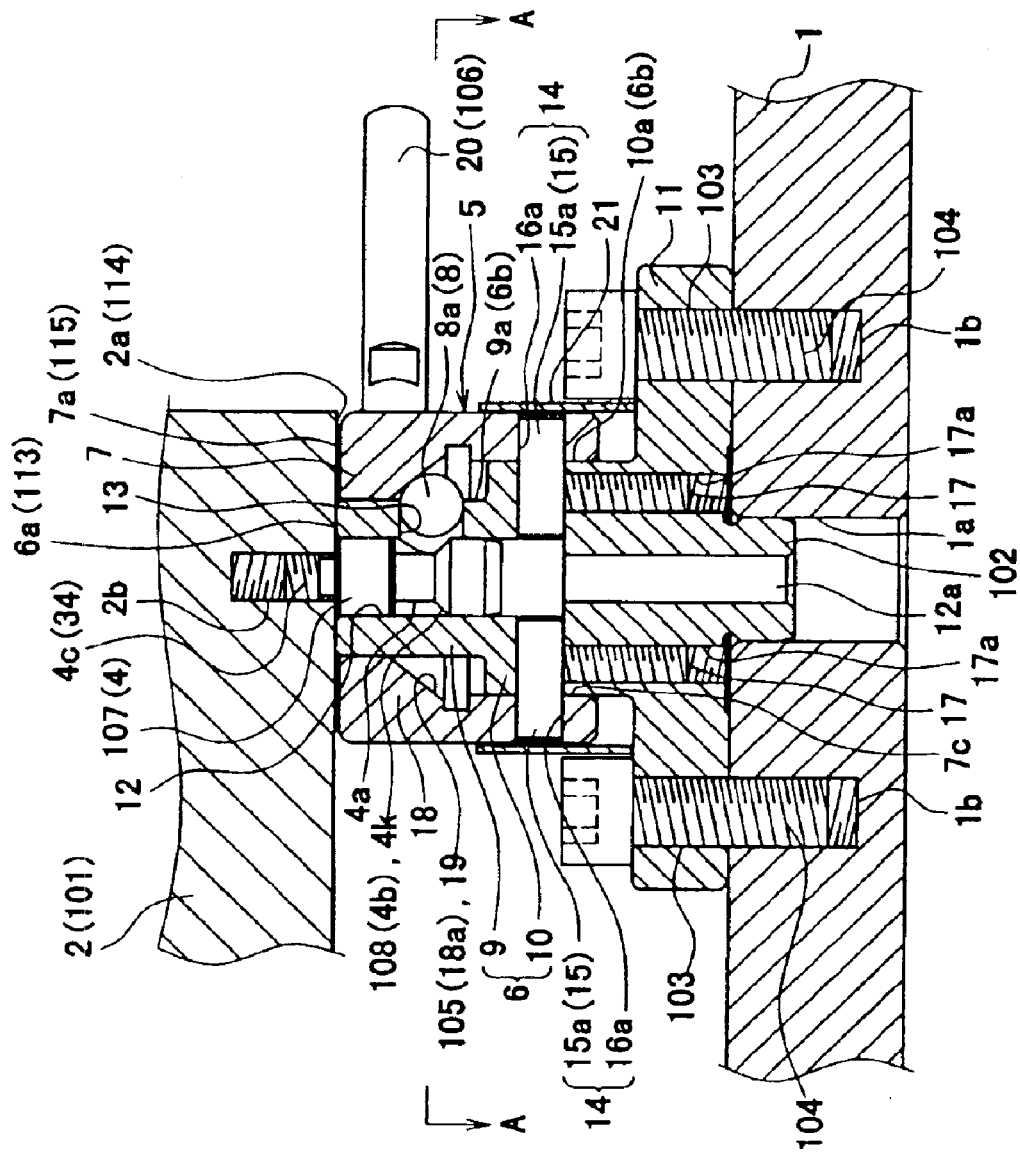
FIG. 2 is a longitudinal sectional view illustrating the state in which a workpiece has not been fixed in the aforementioned embodiment.
Figure 3:
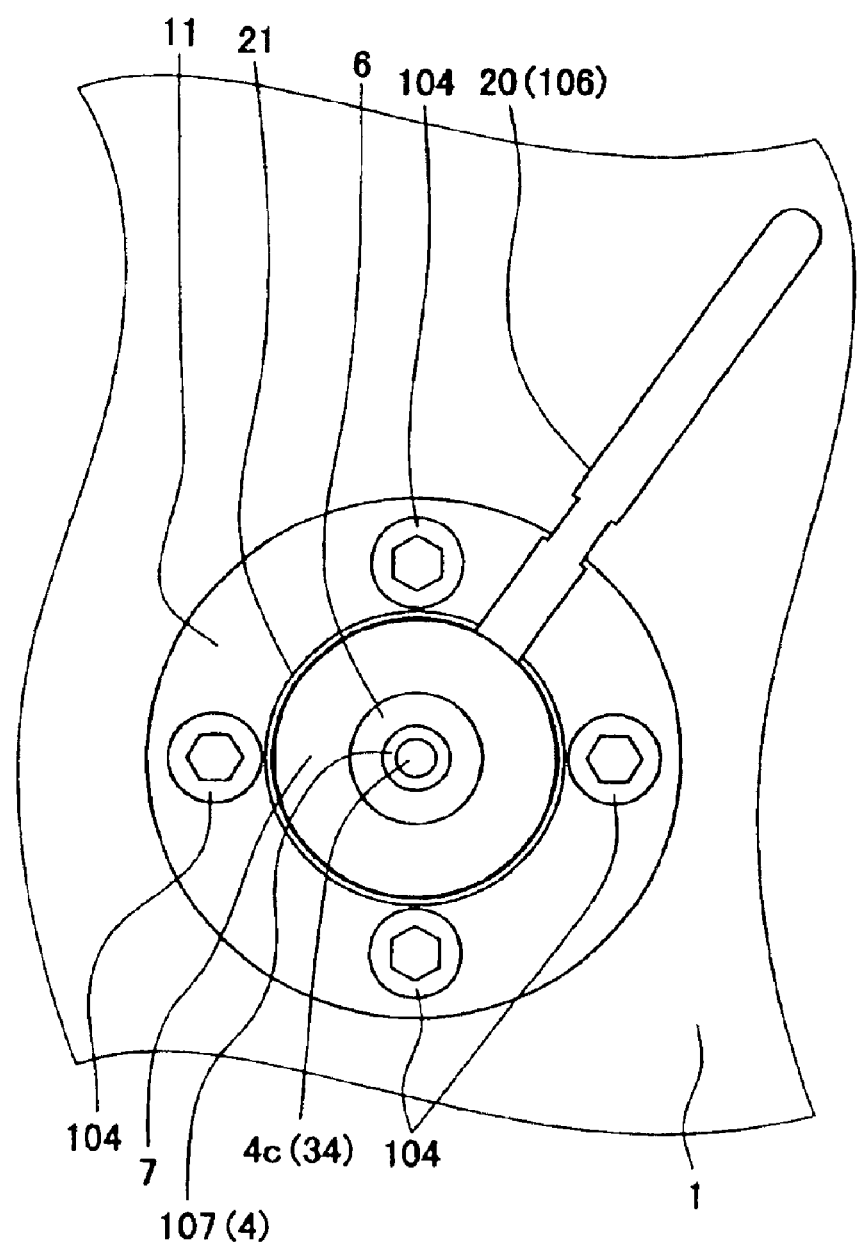
FIG. 3 is a plan view illustrating the position of the lever in the fixture in the state in which a workpiece has not been fixed in the aforementioned embodiment.
Figure 4:
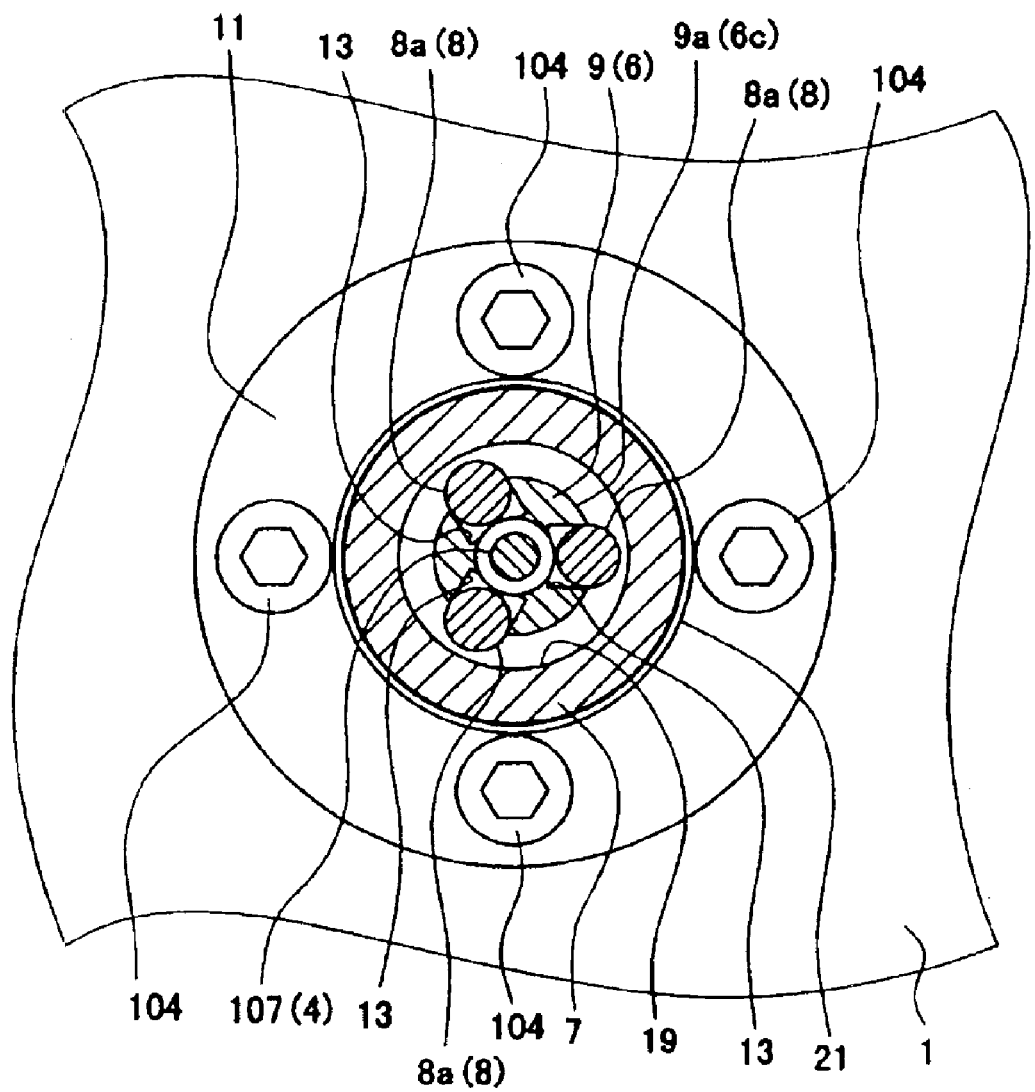
FIG. 4 is a sectional view along the A—A line in FIG. 2 in the aforementioned embodiment.
Figure 5:
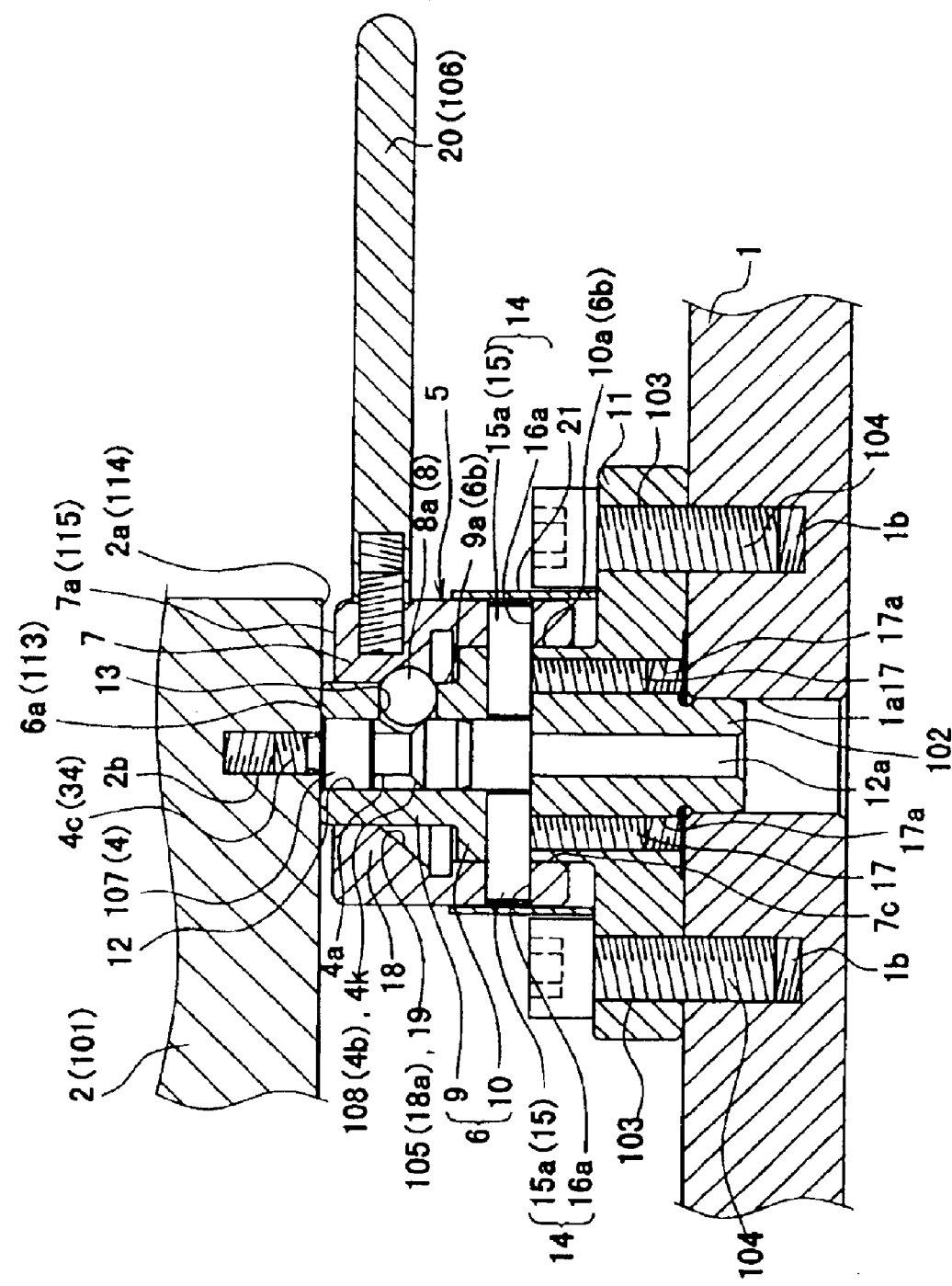
FIG. 5 is a longitudinal sectional view illustrating the state in which a workpiece has been fixed in the aforementioned embodiment.
Figure 6:
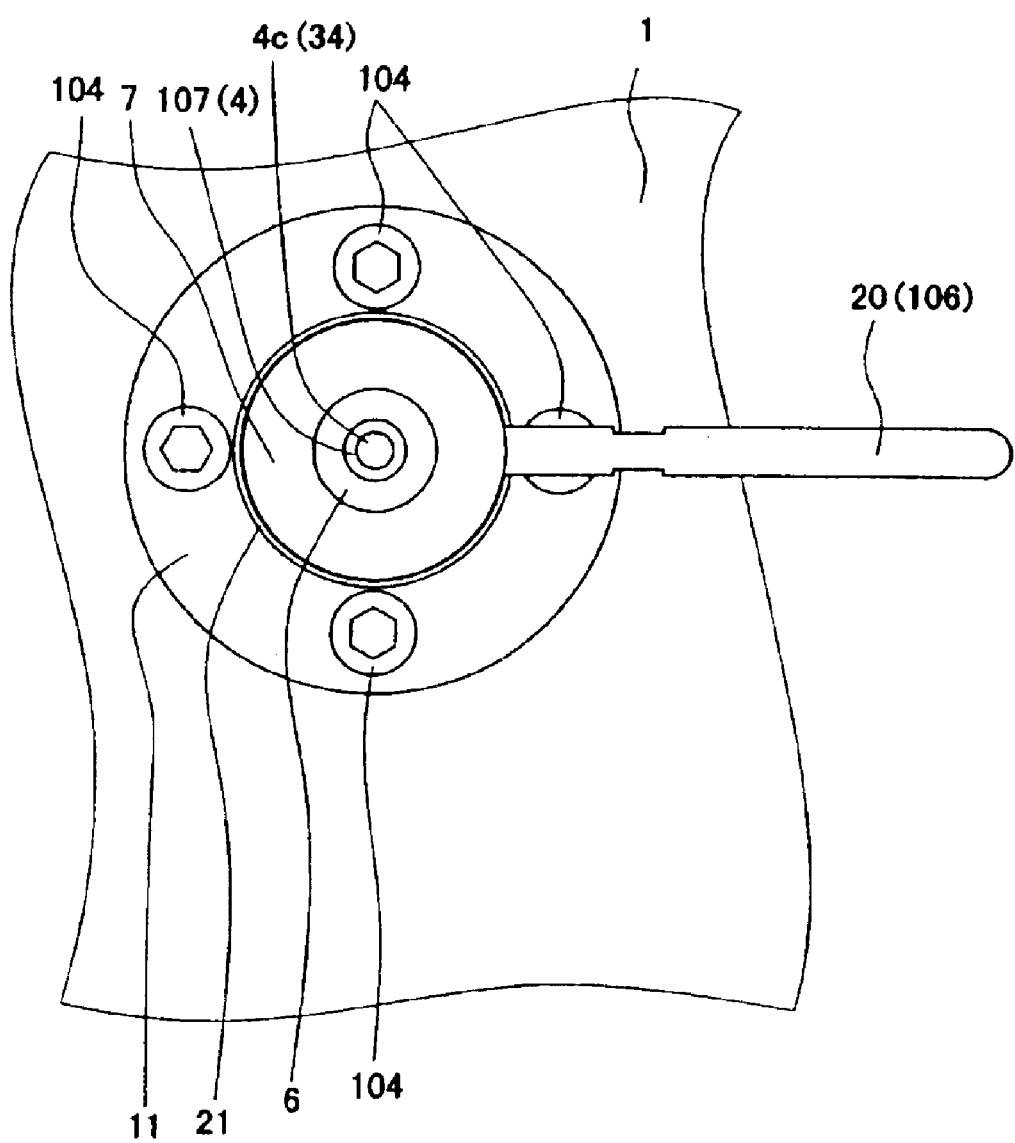
FIG. 6 is a plan view illustrating the position of the lever in the fixture in the state in which a workpiece has been fixed in the aforementioned embodiment.
Figure 7:
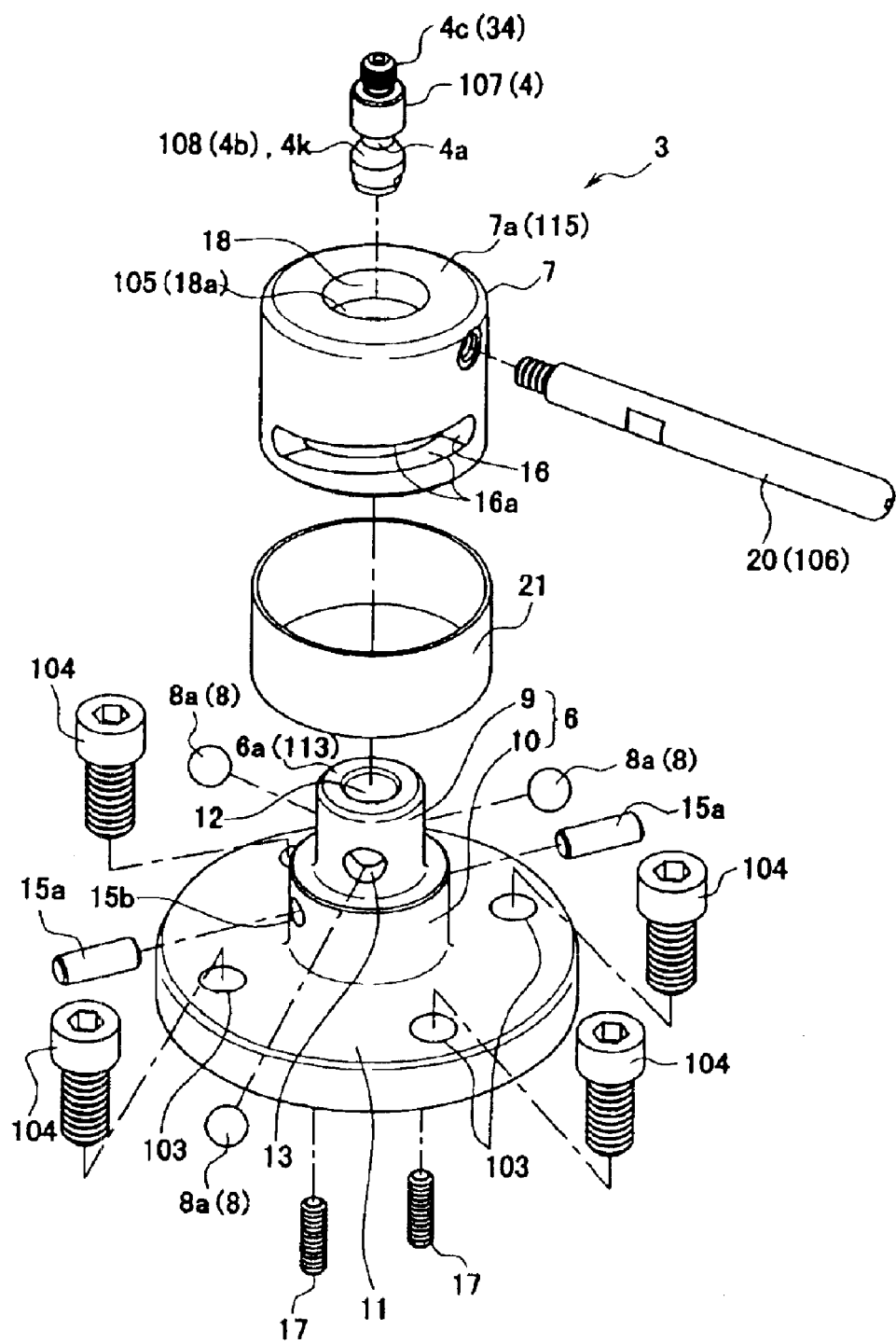
FIG. 7 is an exploded perspective view of the fixture of the aforementioned embodiment.
Figure 8:
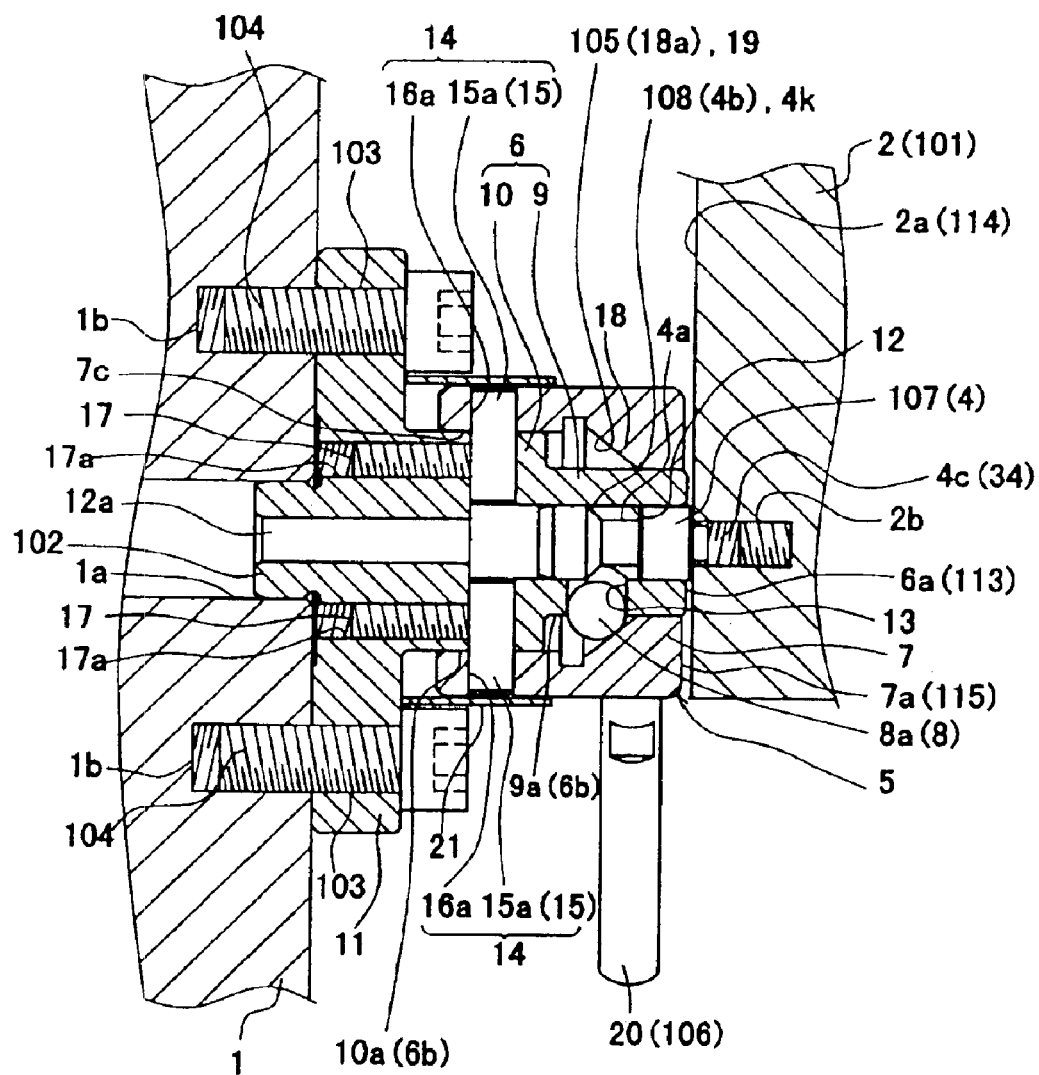
FIG. 8 is a view corresponding to FIG. 2 of the fixture in a state in which the mounting surface of the workpiece and the distal end surface of the body section of the fixture body are not in contact in the aforementioned embodiment.
Figure 9:
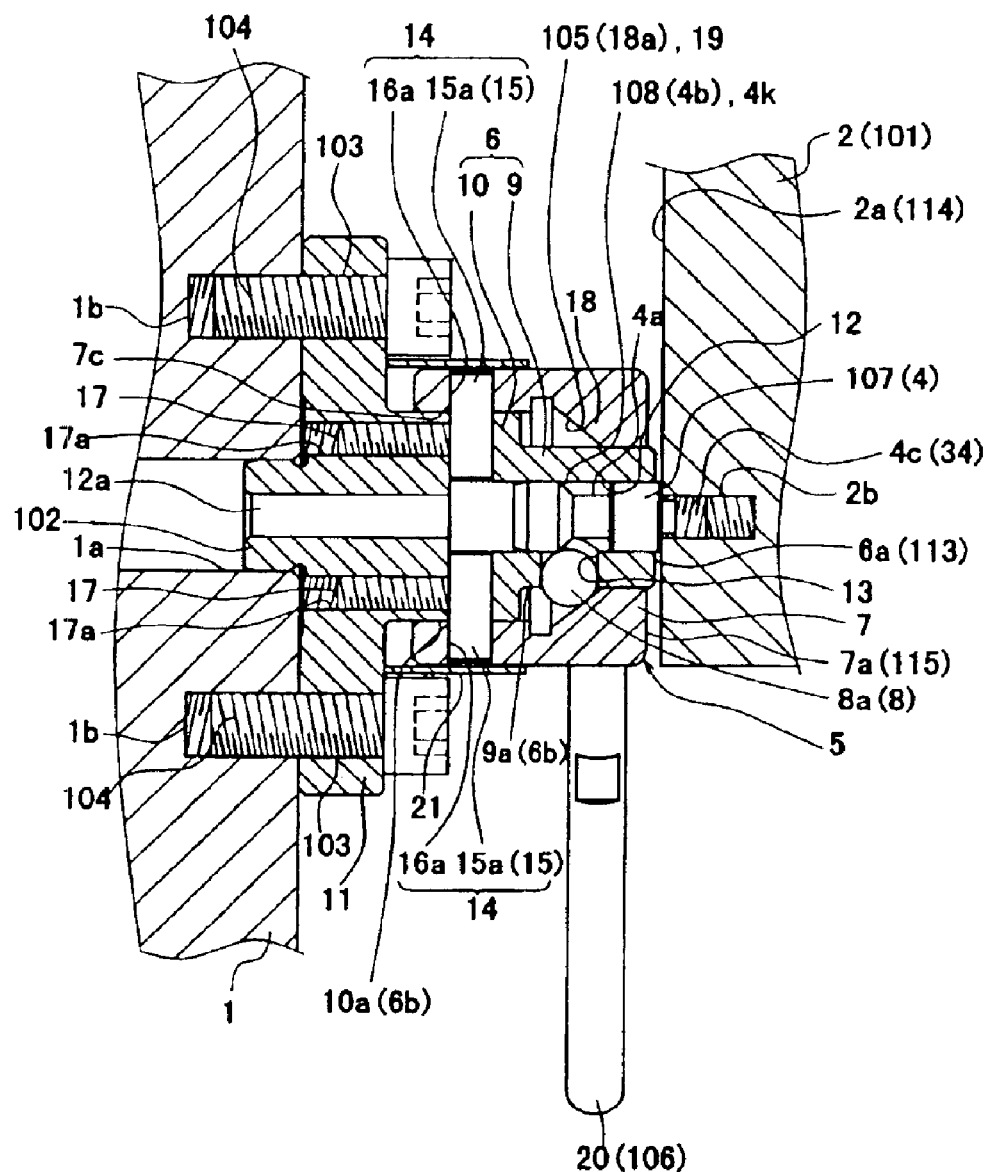
FIG. 9 is a longitudinal sectional view illustrating a state after the engagement of the engagement member with the linking member was released in the fixture in a state in which the mounting surface of the workpiece and the distal end surface of the body section of the fixture body are not in contact in the aforementioned embodiment.
Figure 10:
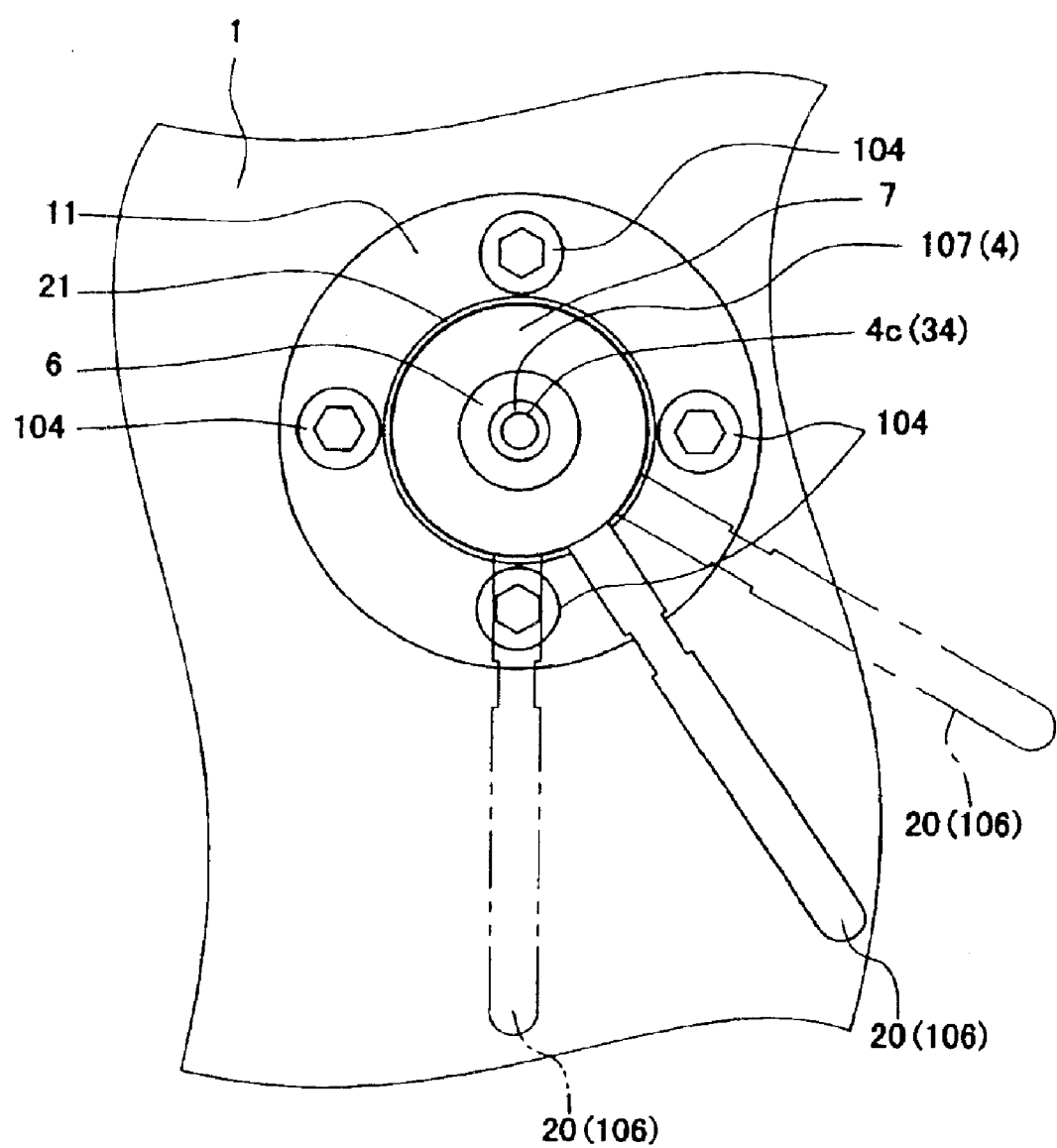
FIG. 10 is a side view showing with a solid line the lever position in a state after the engagement of the engagement member with the linking member was released in the fixture in a state in which the mounting surface of the workpiece and the distal end surface of the body section of the fixture body are not in contact in the aforementioned embodiment.

A key to the reference numbers in the drawings is as follows:
1 fixture base (mounting object)
2 workpiece
3 fixture
4 linking member
4k engagement portion
5 fixture body
6 body section
7 rotary section
8 engagement member
8a ball
11 base portion
12 insertion hole
12a air release hole
13 through hole
14 transmission element
15 guided protrusion
16 guiding groove
16a guiding surface
19 pushing portion
20 lever
23 female threaded portion
24 male threaded portion
33 special tool
101 article to be fixed
102 protruding portion
104, 112 bolt
105, 109 inclined surface
106 operation member
113 distal end surface of body section
115 distal end surface of rotary section

DESCRIPTION OF THE PREFERRED EMBODIMENTS

The preferred embodiments of the fixture in accordance with the present invention will be explained hereinbelow with reference to the appended drawings.

FIGS. 1 to 10 illustrate a first embodiment of the fixture in accordance with the present invention. The reference numeral 1 in the figure denotes a fixture base, which for example is a base plate, which serves as a mounting object and comprises positioning holes 1a, 1a which are through holes and mounting orifices 1b, 1b which are threaded orifices. The reference numeral 2 stands for a workpiece which is to be machined with a machining apparatus such as a machining center and serves as an article 101 to be fixed. For example, female thread orifices 2b, 2b are formed in the lower surface 2a serving as a mount surface 114, so that the below-described linking member 4 can be detachably mounted thereon. The reference numeral 3 stands for a fixture that can be manually operated to fix the workpiece 2 to the fixture base 1 and is composed of the linking member 4 detachably mounted on the workpiece 2 and a fixture body 5 having the linking member 4 attached thereto.

The fixture body 5 comprises a body section 6, a rotary section 7 that can be rotated by manual operation and is rotatably installed on the body section 6, an engagement member 8 disposed on the inner surface side of the rotary section 7, and a transmission element 14 for causing the rotary section 7 to move in the axial direction thereof as the rotary section 7 rotates. The body section 6 has a roughly cylindrical shape, more specifically a cylindrical shape provided with a step in which a cylindrical upper body section 9 is formed integrally with a cylindrical lower body section 10 having a diameter larger than that of the upper body section 9. A round base portion 11 extending as a flange is provided on the body section 6, more specifically, on the lower part of the lower body section 10. A protruding portion 102 that protrudes downward to be inserted into the positioning hole 1a of the fixture base 1 is provided in the central portion of the bottom surface portion of the body section 6. An insertion hole 12 for inserting the aforementioned linking member 4 that was mounted on the workpiece 2 serving as an article 101 to be fixed is formed in the body section 6 from the upper surface 6a serving as a distal end surface 113 thereof toward the bottom portion, and also an air release hole 12a linked to this insertion hole 12 and provided so as to open at the bottom surface side of the body section 6 (a bottom surface side of the protruding portion 102 in the embodiment shown in the figure) is formed therein.

Here, even when the rotary section 7 is in the position closest to the workpiece 2 that is an article 101 to be fixed, that is, when the rotary section 7 is in the highest position (see FIG. 2), the upper surface 6a serving as a distal end surface 113 of the body section 6 protrudes to the outside, that is, upward, from the upper surface 7a serving as a distal end surface 115 of the rotary section 7 so as to allow for the contact with the lower surface 2a serving as a mounting surface 114 for mounting the linking member 4. A plurality of through holes 13, 13 linked to the insertion hole 12 are formed (in the embodiment shown in the figure, there are three such through holes separated by 120 degrees in the circumferential direction of the outer peripheral portion 9a of the upper body section 9) in the outer peripheral portion 6b of the body section 6, more specifically, in the outer peripheral portion 9a of the upper body section 9. For example balls 8a, 8a as engaging members 8, 8 are inserted into those through holes 13, 13 so that the balls can enter the respective insertion holes 12 and exit therefrom. Further, because those balls 8a, 8a protrude into the insertion holes 12 via the through holes 13, 13, they can engage with the below-described engagement portion 4k of the linking member 4 so as to provide a pull-out force in the lengthwise direction (downward direction in the embodiment shown in the figure) of the insertion holes 12. Furthermore, a plurality of bolt holes 103, 103 are provided in the base portion 11. The fixture body 5 is detachably mounted on the fixture base 1 by screwing the bolts 104, 104 that are threaded members passing into the bolt holes 103, 103 of the base portion 11 into the mounting orifices 1b, 1b provided in the fixture base 1 from the surface side of the fixture base 1, that is, from above.

The rotary section 7 is, for example, a hollow portion having a roughly cylindrical shape. In the present embodiment, it has a hollow portion such that the inner diameter thereof is slightly larger than the outer diameter of the lower body section 10. This rotary section is rotatably installed on the body section 6 so as to cover the outer peripheral portion 6b thereof. A ring-like protruding portion 18 which protrudes inwardly is formed in the upper portion on the inner surface 7c of the rotary section 7. Here, the inner diameter of the ring-like protruding portion 18 is slightly larger than the outer diameter of the upper body section 9.

Furthermore, the lower surface 18a of the ring-like protruding portion 18 is provided with an inclined surface 105 which is inclined so as to withdraw from the axial line thereof in one of the axial directions of the rotary section 7 (downward direction in the embodiment shown in the figure). The inclined surface 105 serves as a pushing portion 19 which applies pressure such that the movement of the rotary section 7 in one direction (downward) of the axial directions thereof which follows the rotation of the rotary section 7 causes the ball 8a serving as a linking member 8 to protrude into the insertion hole 12. Further, a lever 20 as an operation member 106 for manual rotation is detachably mounted, for example, by screwing, on the upper part of the outer peripheral portion of the rotary section 7. Furthermore, a ring-like cover member 21 is installed on the outside of the rotary section 7 so as to cover the guiding grooves 16, 16 provided with the below-described guiding surface 16a. This cover member 21 is provided to prevent foreign matter, such as dust, from penetrating into the guiding grooves 16, 16, but installing the cover member is optional.

The transmission element 14 is composed of the guiding surface 16a provided on the rotary section 7, being either of the body section 6 and the rotary section 7, and guided protrusions 15 which are provided on the body section 6, being the other of the two, engaged with the guiding surface 16a, and guided along the guiding surface 16a by the rotation of the rotary section 7. More specifically, two guided protrusions 15 are provided with a 180-degree spacing in the circumferential direction on the outer peripheral portion 10a of the lower body section 10. Those guided protrusions 15, 15 are composed, for example, of protruding portions of pins 15a, 15a that can be inserted into respective pin insertion holes 15b, 15b formed as through holes so as to be connected to the insertion hole 12 on the outer peripheral portion 10a of the lower body section 10, this insertion being such that the distal ends thereof protrude from those pin insertion holes 15b, 15b. Here, the pins 15a, 15a are strongly fixed by screwing the threaded members 17 into respective threaded holes 17a, 17a provided so as to pass from the bottom surface side of the base portion 11 to the pin insertion holes 15b, 15b and bringing the distal ends of the threaded members 17 into contact with the outer peripheral surface of the pins 15a, 15a. On the other hand, two guiding grooves 16 comprising the guiding surface 16a are formed as long through holes so as to extend in the circumferential direction in the lower part of the rotary section 7, and the guiding surfaces 16a, 16a of those guiding grooves 16, 16 (more specifically, in the embodiment shown in the figure, the upper and lower surface extending in the circumferential direction of the guiding groove 16 serve as the guiding surfaces 16a) are inclined upward and to the right at a prescribed angle with respect to a horizontal plane, for example, at an angle of about 4 degrees with respect to the horizontal plane.

The linking member 4 is composed, for example, of a bolt member 107. A male threaded portion 4c serving as a mount portion 34 which is to be mounted on the workpiece 2 serving as the article 101 to be fixed is provided at one end portion thereof (upper portion in the embodiment shown in the figure), and this male threaded portion 4c is screwed into the female threaded orifice 2b of the workpiece 2. Furthermore, a groove-like depression 4a is provided on the entire outer periphery of the axial portion of the bolt member 107 in the portion which is close to another end of the bolt member 107 (in the embodiment shown in the figure, the portion close to the lower end, that is, the portion close to the end on the side which is inserted into the insertion hole 12).

The lower surface 4b of the depression 4a is an inclined surface 108 which is inclined so as to withdraw from the axis thereof as it approaches the aforementioned other end. This inclined surface 108 serves as the engagement portion 4k to be engaged with the ball 8a serving as an engagement member 8.

The operation effect of the fixture 3 having the above-described structure will be described below. The fixture body 5 is mounted on the fixture base 1 by inserting the protruding portion 102 provided on the base portion 11 into the positioning hole 1a of the fixture base 1, and inserting the bolts 104, 104 into the bolt holes 103, 103 and screwing them into the mounting orifices 1b, 1b of the fixture base 1 (in the embodiment shown in the figures, four fixture bodies 5 are mounted on the fixture base 1. See FIG. 1). Furthermore, the bolt member 107 (linking member 4) is mounted on the workpiece 2 by screwing the male threaded portion 4c thereof into the female threaded orifice 2b of the workpiece 2 from below. Then, the bolt member 107 mounted on the workpiece 2 is inserted into the insertion hole until the lower surface 2a of the workpiece 2 abuts the upper surface 6a of the body section 6, and the workpiece 2 is placed on the fixture bodies 5, 5. At this time, when the positioning hole 1a of the fixture base 1 passes to the outside, air present inside the insertion hole 12 is released to the outside of the body section 6 via the air release hole 12a and then guided to the outside through the positioning hole 1a. Therefore, the bolt member 107 can be smoothly inserted into the insertion hole 12. Furthermore, at this point in time, the ball 8a assumes a state in which it does not protrude to the insertion hole 12, but part thereof protrudes from the outer peripheral surface of the body section 6, more specifically, from the outer peripheral surface of the upper body section 9 (see FIGS. 2 and 4).

Further, if the rotary section 7 is manually rotated, for example, clockwise via a lever 20, the guided protrusion 15 is guided along the guiding surface 16a. At this time, because the upper surface 6a of the body section 6 protrudes upward beyond the upper surface 7a of the rotary section 7, the upper surface 7a of the rotary section 7 is not in contact with the lower surface 2a of the workpiece 2. Therefore, the rotation of the rotary section 7 can be executed smoothly. Here, because the guiding surfaces 16a, 16a are inclined upward and to the right with respect to the horizontal plane, the guided protrusions 15, 15 move upward with respect to the rotary section 7. Since the guided portion 15 is fixed to the body section 6, the rotary section moves downward with respect to the body section 6. Further, because the inclined surface 105 (pushing portion 19) of the rotary section 7 moves downward (one direction of axial directions of the rotary section 7) with respect to the body section 6, the ball 8a is pushed from the outer peripheral surface of the upper body section 9 toward the insertion hole 12. As a result, the ball 8a smoothly moves inside the through hole 13, protrudes into the insertion hole 12, and engages with the engagement portion 4k of the bolt member 107.

At this time, the ball 8a pushes the inclined surface 108 (engagement portion 4k). As a result, the bolt member 107 is also pushed in the axial direction thereof and in the lengthwise direction of the insertion hole 12 and a pull-out force is provided in the lengthwise direction of the insertion hole 12. Therefore, the linking member 4 is strongly fixed to the fixture body 5 and the lower surface 2a of the workpiece 2 is tightly pressed against the upper surface 6a of the body section 6 (see FIGS. 5, 6). As a result, the workpiece 6 is tightly fixed to each fixture body 5, 5. In the embodiment shown in the figures, the fixture body 5 is mounted on the upper surface of the base plate serving as a fixture base 1, but it may be also mounted on the side surface of the fixture base 1 composed of four-surface blocks (see FIGS. 8, 9). In this case, when the bolt member 107 is inserted in the insertion hole 12, that is, in a state in which the workpiece 2 is not fixed to the fixture body 5, there is a risk of the mounting surface 114 of the workpiece 2 and the distal end surface 113 of the body section 6 assuming a state in which they are not tightly pressed against each other. (See FIG. 8. The position of the lever 20 in this state is shown by a dot-dash line in FIG. 10.) If the rotary section 7 is rotated clockwise in such a fixture 3 in which the mounting surface 114 of the workpiece 2 and the distal end surface 113 of the body section 6 are not in contact with each other, then the ball 8a will move inside the through hole 13, protrude into the insertion hole 12, and engage with the engagement portion 4k of the bolt member 107. (See FIG. 9. The position of the lever 20 in this state is shown by a solid line in FIG. 10.) At this time, the mounting surface 114 of the workpiece 2 and the distal end surface 113 of the body section 6 are not in contact with each other. If the rotary section 7 is further rotated clockwise (the position of the lever 20 in this state is shown by a two-dot-dash line in FIG. 10), the pull-out force is applied by the ball 8a to the bolt member 107 in the lengthwise direction (in FIG. 8 and FIG. 9, this is the direction to the left) of the insertion hole 12. As a result, the bolt member 107 and the workpiece 2 move so as to be pulled to the left. Therefore, the mounting surface 114 of the workpiece 2 abuts the distal end surface 113 of the body section 6 and the workpiece 2 is tightly fixed to the fixture body 5.

Further, in the embodiment shown in the figure, three through holes 13 are formed equidistantly in the outer peripheral portion 9a of the upper body section 9, and a ball 8a is inserted in each through hole 13. Therefore, in the bolt member 107, a pressure is uniformly applied to the inclined surfaces 108 thereof from three directions. As a result, the bolt member 107 is fixed so that the central axis thereof is not inclined with respect to the central axis of the insertion hole 12.

Thus, the fixture 3, while having a simple structure, can fix the workpiece 2 tightly and with good stability to the mounting object. Further, if the rotary section 7 is rotated in the counterclockwise direction (in the embodiment shown in the figures, this is the rotation from the position of the lever 20 shown in FIG. 6 to the position of the lever 20 shown in FIG. 3) via the lever 20 in order to remove the workpiece 2 from the fixture 3, then the rotary section 7 moves upward with respect to the body section 6 because the guided protrusion 15 is guided by the guiding surfaces 16a. Further, because the inclined surface 105 (pushing portion 19) of the rotary section 7 also moves upward, the inclined surface 105 (pushing portion 19) stops pushing the ball 8a toward the insertion hole 12 and a state is assumed in which the ball 8a can move in the direction toward the outer peripheral surface of the body section 6 inside the through hole 13. Here, if the bolt member 107 is pulled up, the inclined surface 108 (engagement portion 4k) of the bolt member 107 moves the ball 8a in the direction toward the outer peripheral surface of the body section 6. The ball 8a then moves in the direction toward the outer peripheral surface to a position in which it does not protrude into the insertion hole 12. As a result, the engagement of the ball 8a and engagement portion 4k is released and the bolt portion 107 is pulled out from the fixture body 5.

Figure 11:
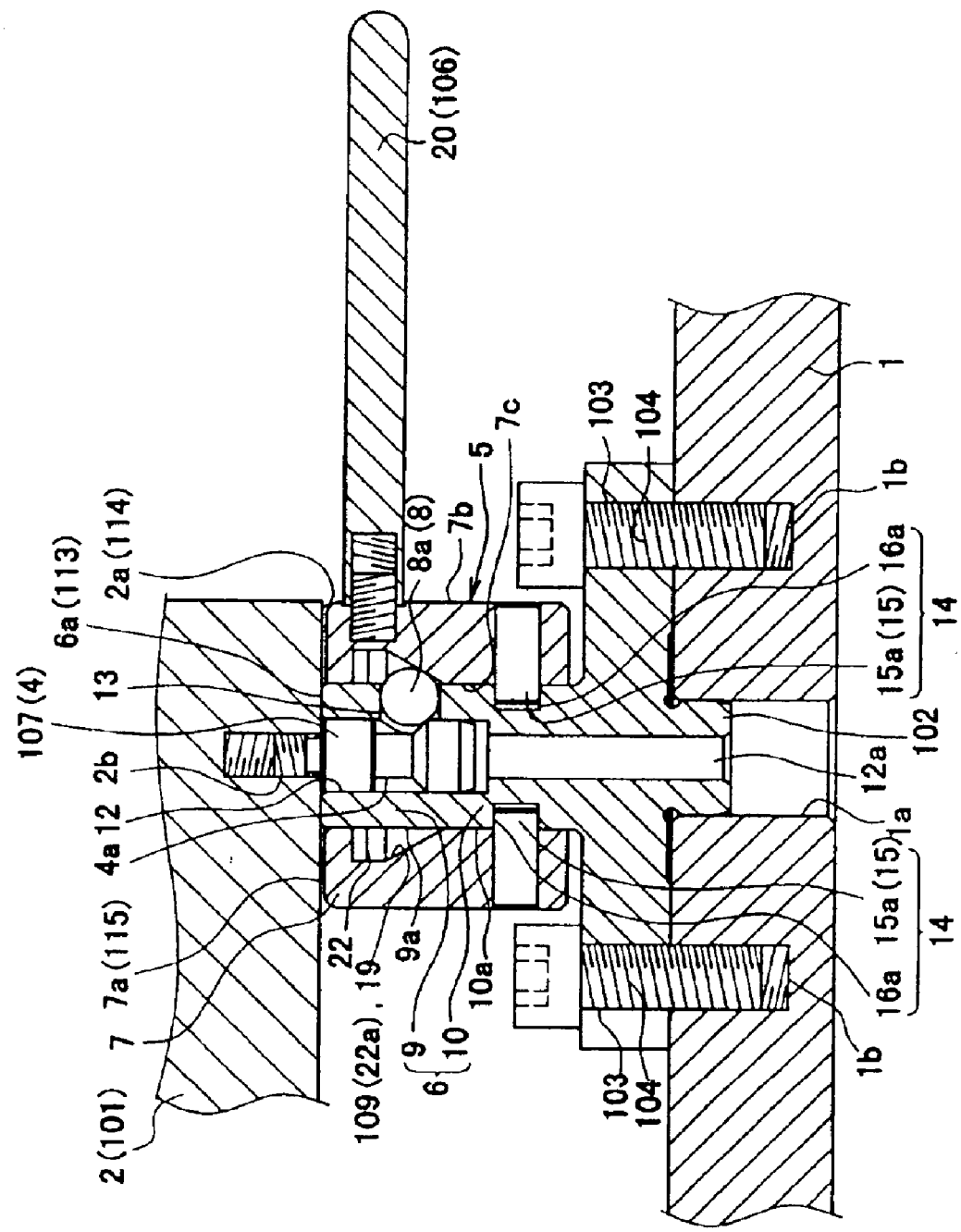
FIG. 11 is a view corresponding to FIG. 5 of the second embodiment of the fixture in accordance with the present invention.
Figure 12:
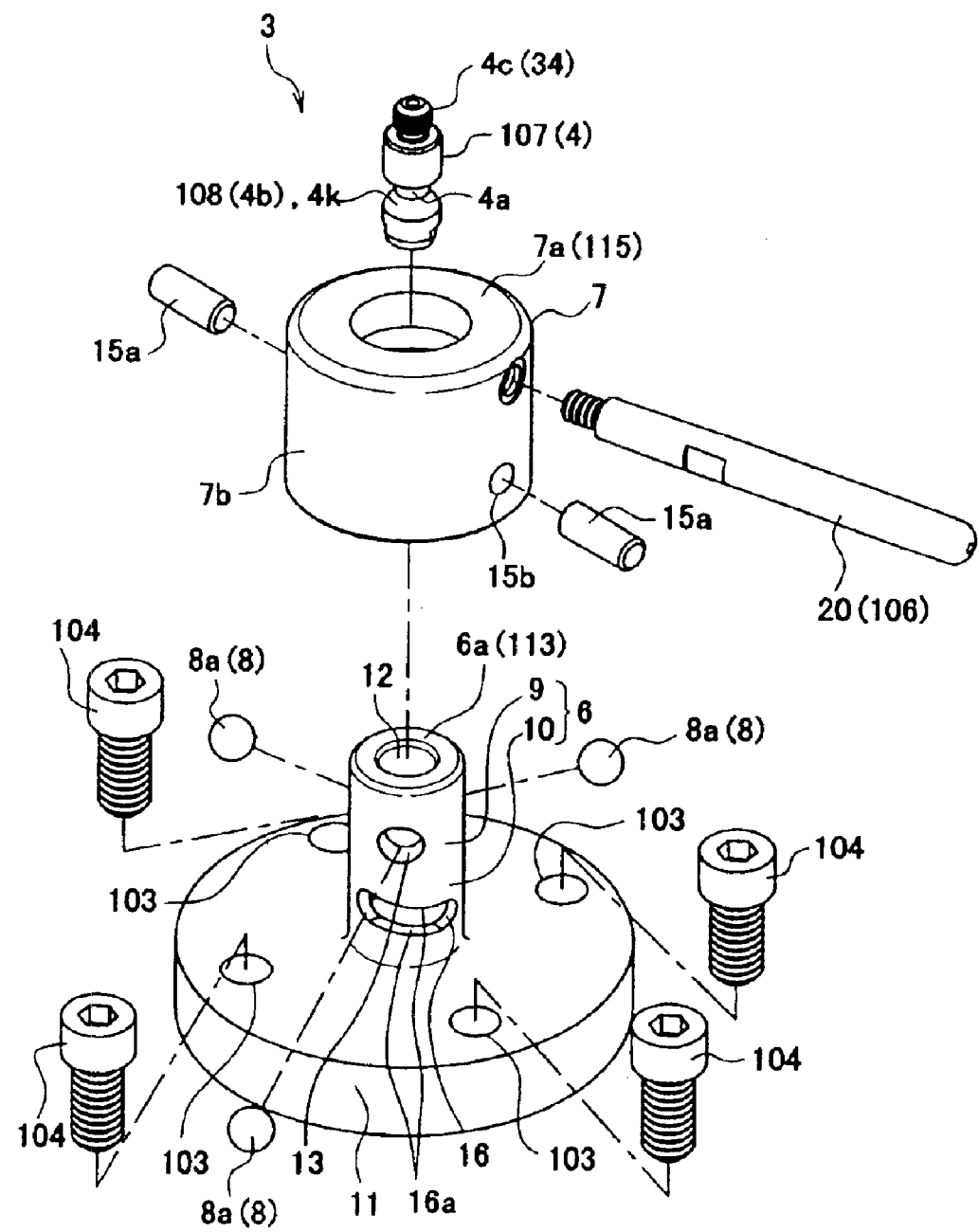
FIG. 12 is an exploded perspective view of the fixture of the second embodiment.
Figure 13:
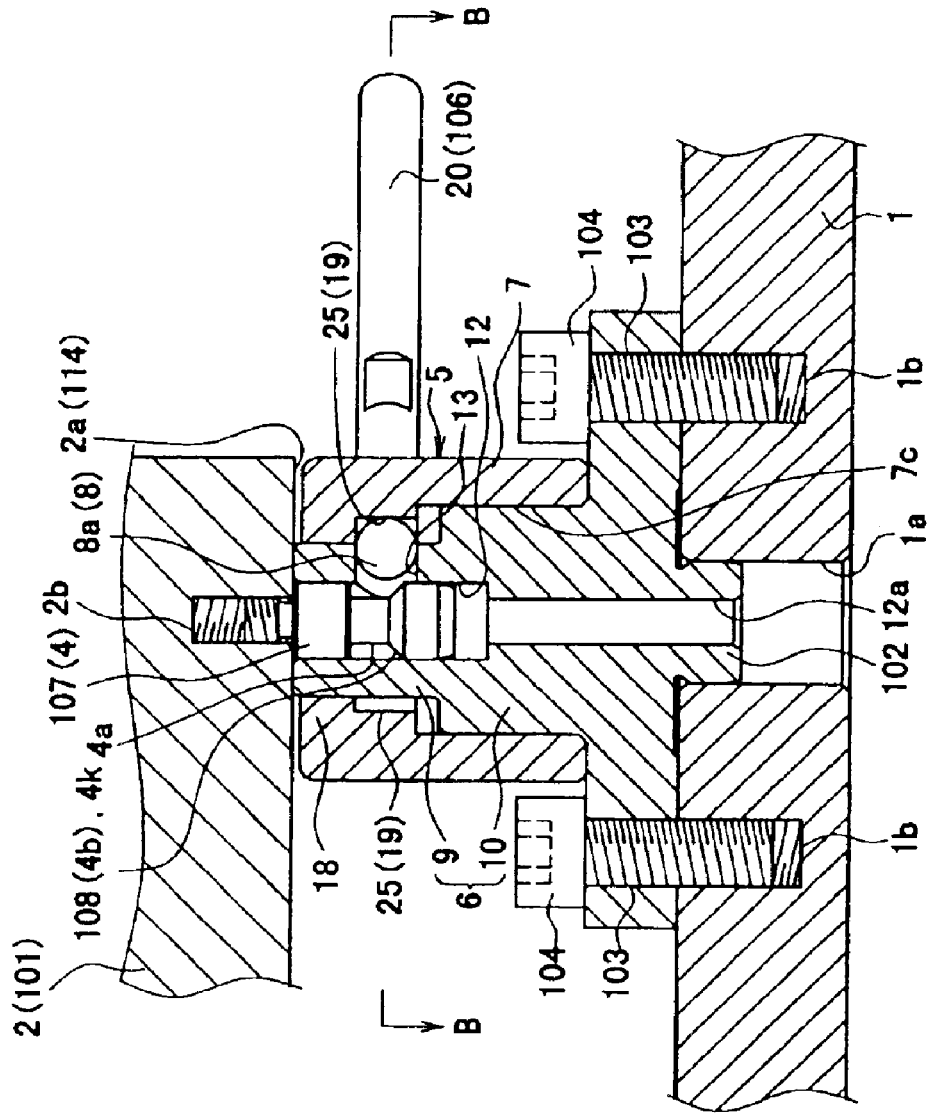
FIG. 13 is a longitudinal sectional view illustrating a state in which the workpiece is not fixed in the third embodiment of the fixture in accordance with the present invention.
Figure 14:
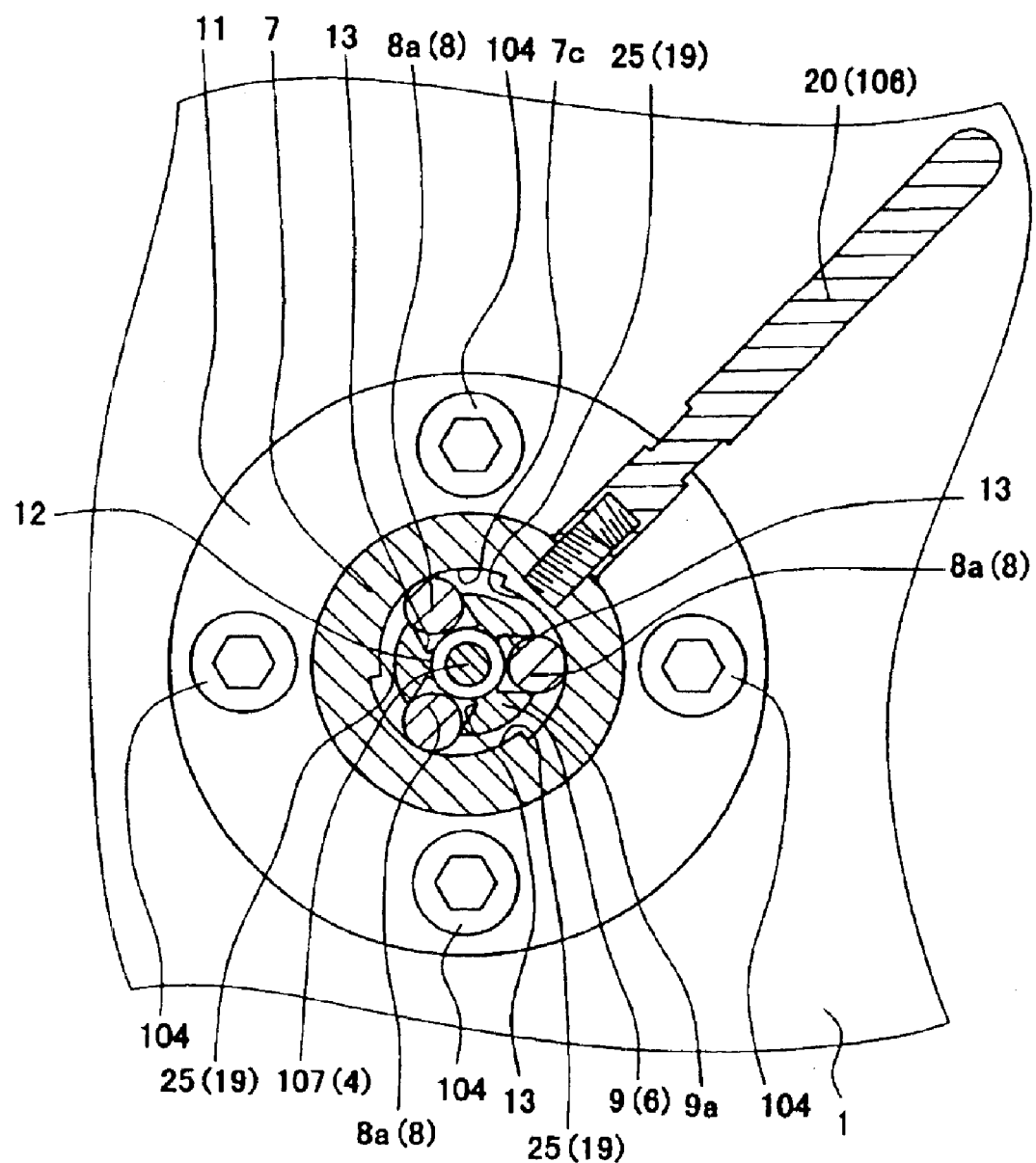
FIG. 14 is a sectional view along the B—B line in FIG. 13 in the third embodiment.
Figure 15:
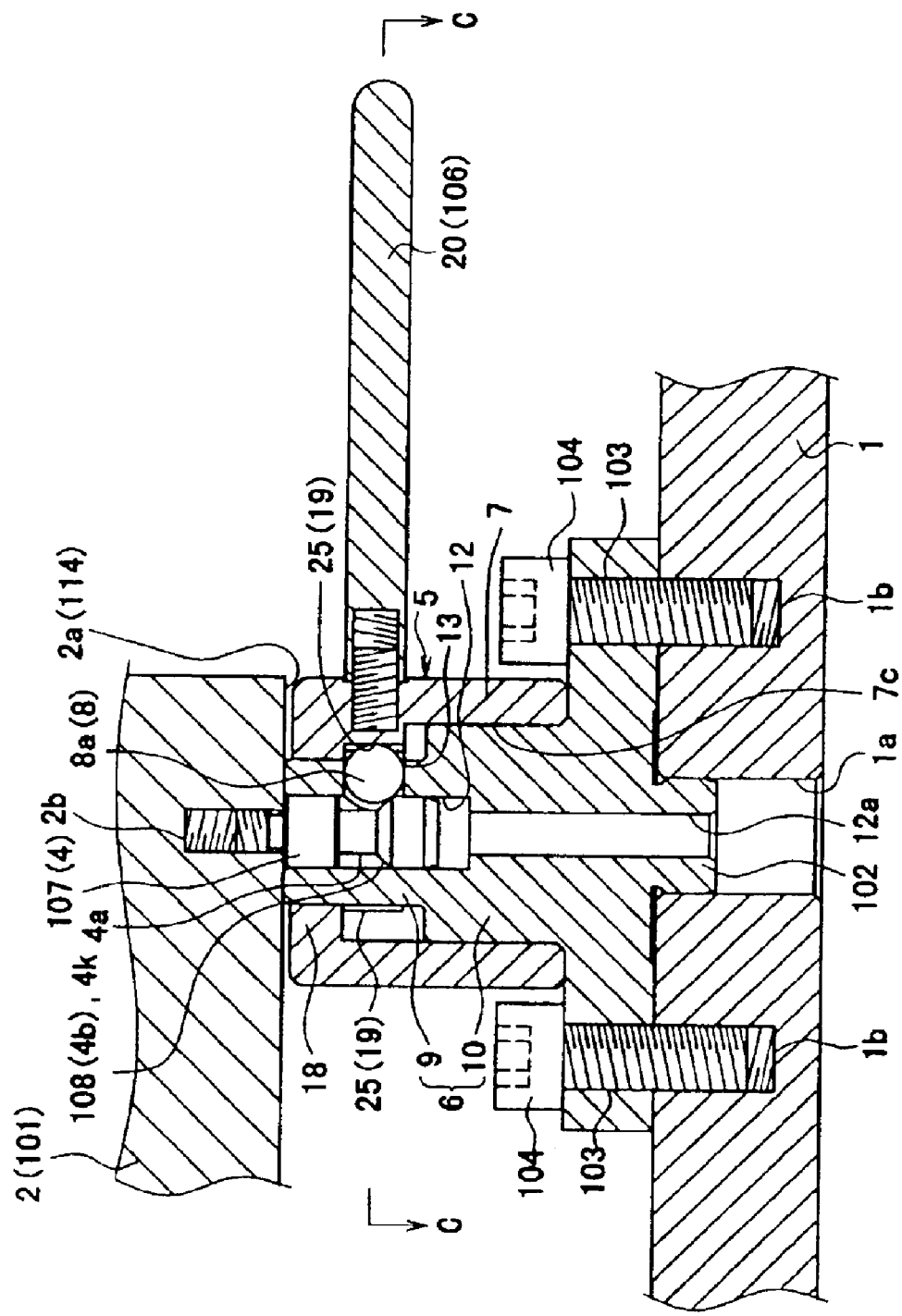
FIG. 15 is a longitudinal sectional view illustrating a state in which the workpiece was fixed in the third embodiment.
Figure 16:
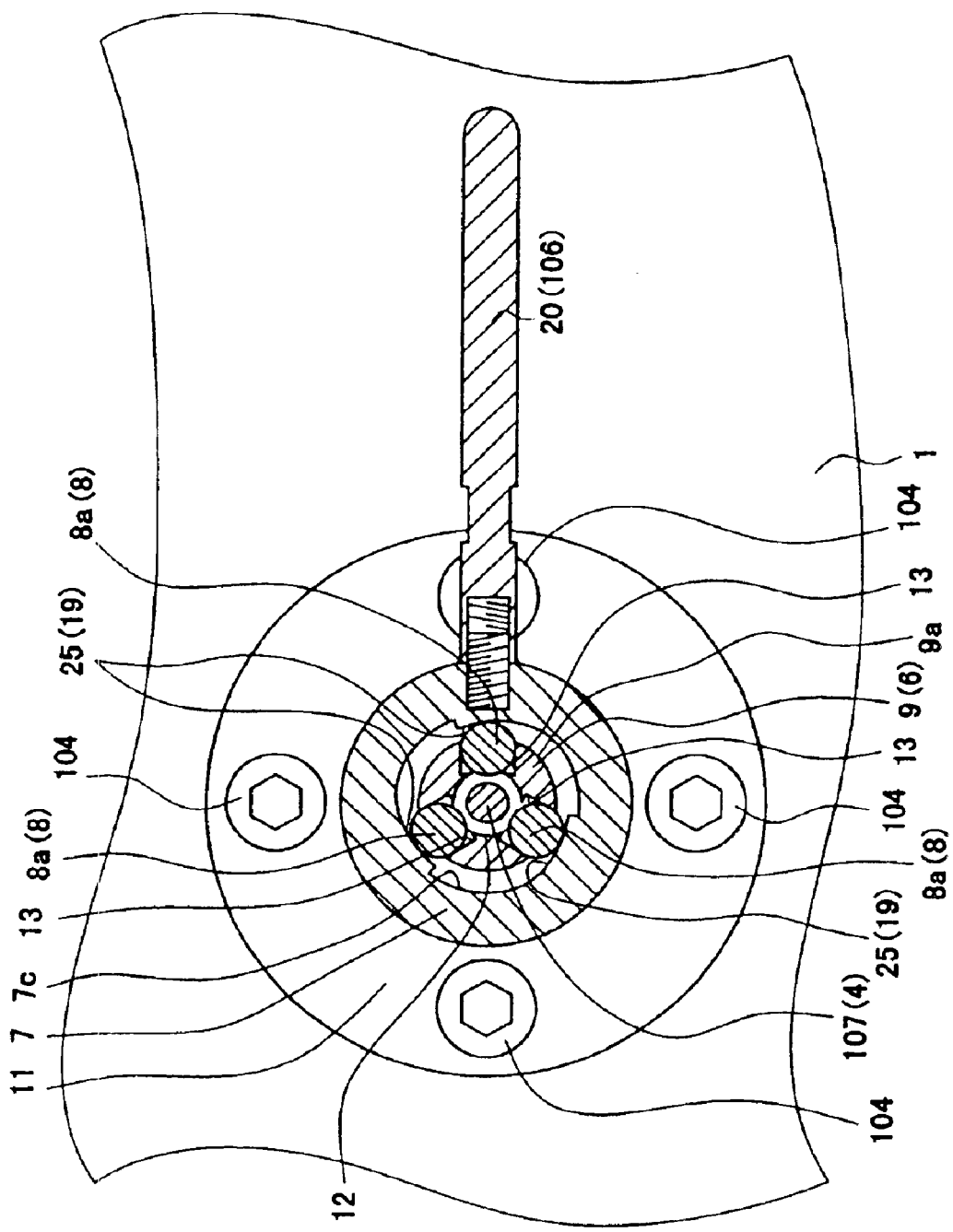
FIG. 16 is a sectional view along the C—C line in FIG. 15 in the third embodiment.

FIG. 11 and FIG. 12 illustrate the second embodiment of the fixture in accordance with the present invention. In the second embodiment, due to a different configuration of the pushing portion 19 and transmission element 14, the implementation modes of the body section 6 and rotary section 7 are different from those of the first embodiment, but other components are the same. The explanation below will be focused on the different components.

In the body section 6, a cylindrical upper body section 9 and the cylindrical lower body section 10 which has the same diameter as the upper body section 9 are formed integrally. Two guiding grooves 16, 16 comprising guiding surfaces 16a, 16a constituting a transmission element for moving the rotary section 7 in the axial direction thereof following the rotation of the rotary section 7, are provided in the form of long orifices in the body section 6 which is one of either the body section 6 or the rotary section 7, more specifically, in the outer peripheral portion 10a of the lower body section 10. The guiding surfaces 16a, 16a (more specifically, in the embodiment shown in the figures, the upper and lower surfaces extending in the circumferential direction of the guiding groove 16 serve as the guiding surfaces 16a) of those guiding grooves 16, 16 extend so as to have a prescribed angle with respect to a horizontal plane, for example, so as to be inclined downward to the right. Furthermore, similarly to the first embodiment, an insertion hole 12, a through hole 13, a base portion 11, a protruding portion 102, and an air release hole 12a are formed in the body section 6.

The rotary section 7 has a cylindrical shape with the inner diameter thereof being slightly larger than the outer diameter of the body section 6. Two guided protrusions 15, 15 constituting the transmission element 14 and engaged with the guiding surfaces 16a, 16a are provided with a 180-degree displacement in the circumferential direction, so as to be guided along the guiding surfaces 16a, 16a by the rotation of the rotary section, in the rotary section 7 which is the other of the body section 6 and rotary section 7, more specifically, in the lower portion on the inner surface 7c of the rotary section 7. In the embodiment shown in the figure, those guided protrusions 15, 15 are composed of protruding portions of pins 15a, 15a which are pushed and inserted into the pin insertion holes 15b, 15b provided so as to pass from the outer surface 7b of the rotary section 7 to the inner surface 7c thereof. The pins are inserted so that the distal ends thereof protrude from those pin insertion holes 15b, 15b in the direction of the guiding surfaces 16. Further, a ring-like recess 22 which becomes deeper in the upward direction is formed in the upper portion in the inner surface 7c of the rotary section 7. Furthermore, the lower surface 22a of the ring-like recess 22 becomes an inclined surface 109 which withdraws from the aforementioned axis along one direction (upward direction in the embodiment shown in the figure) of the axial directions of the rotary section 7. Further, because the rotary section 7 moves in one direction (upward) of the axial directions as the rotary section 7 rotates, this inclined surface 109 becomes a pushing portion 19 pushing the ball 8a serving as an engagement member 8 so that it protrudes into the insertion hole 12. Further, a lever 20 serving as an operation member 106 is detachably mounted on the rotary section 7, similarly to the first embodiment.

With the fixture of the second embodiment, the rotary section 7 is moved upward by rotating the rotary section 7, clockwise. Further, because the rotary section 7 moves upward, the inclined surface 109 (pushing portion 19) pushes the ball 18a so that it protrudes into the insertion hole 12.

FIGS. 13 to 16 illustrate the third embodiment of the fixture in accordance with the present invention. In the third embodiment, by contrast with the first embodiment, the fixture body 5 does not comprise the transmission element 14, that is, although the rotary section 7 can rotate, it cannot move in the axial direction thereof as it rotates. Furthermore, because the configurations of pushing portions 19 in the two embodiments are different, the configurations of the rotary sections 7 are different, but other components are the same. The explanation below will be focused on the different components.

The rotary section 7 has a cylindrical shape with the inner diameter thereof being slightly larger than the outer diameter of the lower body section 10 in the body section 6. A ring-like protruding portion 18 which protrudes inwardly is formed in the upper portion at the inner surface 7c of the rotary section 7, more specifically, in the upper portion positioned above the position where the through hole 13 is provided. Here, the inner diameter of the ring-like protruding portion 18 is slightly larger than the outer diameter of the upper body section 9. Furthermore, three pushing protruding portions 25, 25 which protrude inwardly as the inner surface 7c advances, for example, counterclockwise, are formed equidistantly in the circumferential direction of the inner surface 7c below the ring-like protruding portion 18 located on the inner surface 7c. The pushing protruding portions 25, 25 constitute a pushing portion 19 which pushes the ball 8a serving as an engagement member 8 so that it protrudes into the insertion hole 12 as the rotary section 7 rotates.

With the fixture of the third embodiment, the gap between the pushing protruding portion 25 (pushing portion 19) and the through hole 13 decreases as the rotary section 7 rotates clockwise. Thus, when the rotary section 7 is rotated clockwise, the pushing protruding portion 25 pushes the ball 8a from the outer peripheral surface of the upper body section 9 toward the insertion hole 12. As a result, the ball 8a smoothly moves inside the through hole 13, protrudes into the insertion hole 12 and engages with the engagement portion 4k of the bolt member 107 serving as the linking member 4 (see FIG. 15 and FIG. 16). Here, the pushing protruding portion 25 is formed so that it protrudes inwardly as the inner surface 7c advances counterclockwise, but it may be also formed so as to protrude inwardly as the inner surface advances clockwise. In this case, the bolt member 107 serving as the linking member 4 is fixed to the fixture body 5 by a counterclockwise rotation of the rotary section 7.

Further, the present invention is not limited to the above-described embodiments and various modifications thereof are possible. For example, in the first to third embodiments, note the upper surface 6a serving as the distal end surface 113 of the body section 6 protruded above the upper surface 7a serving as a distal end surface 115 of the rotary section 7, but such a protruding configuration is not always necessary. Thus, the distal end surface 113 of the body section 6 and the distal end surface 115 of the rotary section 7 may be in the same plane.

Furthermore, in the first embodiment, the pins 15a, 15a were fixed with the threaded member 17, but they may be also fixed by inserting them under pressure into the pin insertion holes 15b, 15b. In this case, it is obviously not necessary to provide the body section 6 with the threaded holes 17a, 17a. Furthermore, the guided protrusions 15, 15 were composed of protruding portions of two pins 15a, 15 which are to be inserted in respective pin insertion holes 15b, 15b, but they may be also composed of a protruding portion of one pin which crosses the insertion hole 12 and is inserted in both pin insertion holes 15b, 15b so that the two ends thereof protrude from respective pin insertion holes 15b, 15b.

Further, in the first embodiment, the guided protrusions 15 may be provided on the rotary section 7, and the guiding surfaces 16a may be provided on the body section 6, as in the second embodiment. Moreover, in the second embodiment, the guided protrusions 15 may be provided on the body section, and the guiding surfaces 16a may be provided on the rotary section, as in the first embodiment. Furthermore, it is not necessary that there be two guided protrusions 15 and two guiding surfaces 16. Thus, only one guided protrusion and one guiding surface may be provided, or the number thereof may be three or more.

Further, in the first embodiment, the guiding surface 16a extended so as to be inclined upward to the right with respect to the horizontal plane, but it may also extend so as to be inclined downward to the right with respect to the horizontal plane, as in the second embodiment. Similarly, in the second embodiment, too, the guiding surface 16a may extend so as to be inclined upward and to the right. In those cases, when the rotary section 7 is rotated counterclockwise, the linking member 4 is fixed to the fixture body 5. Furthermore, the angle at which the guiding surface 16a was inclined to the horizontal plane was about 4 degrees in the first embodiment, but this numerical value is not limiting.

Figure 18:
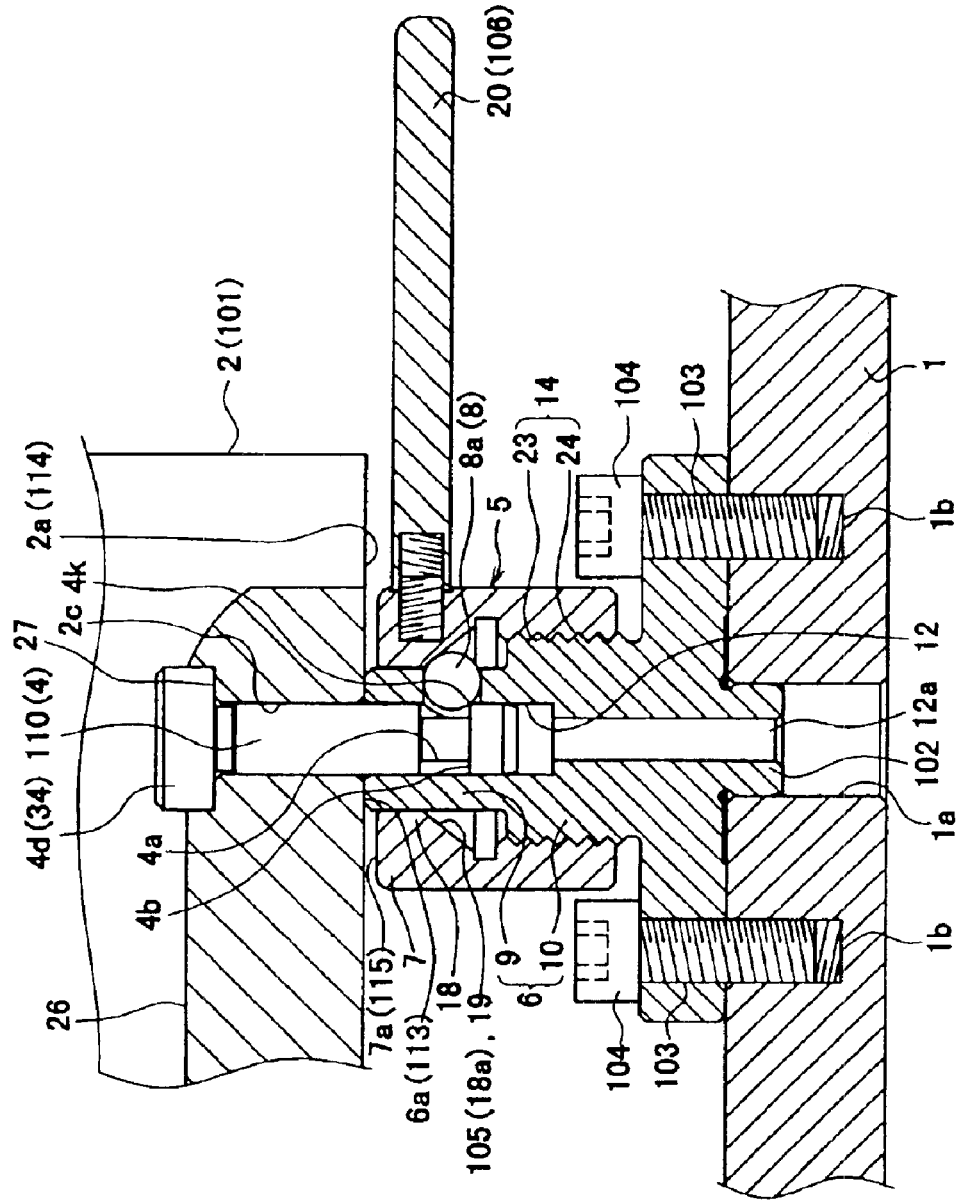
FIG. 18 is a longitudinal sectional view illustrating a state in which the workpiece was fixed in this other embodiment.

Furthermore, in the first and second embodiments, the transmission element 14 was composed of the guided protrusion 15 and guiding surface 16a, but as shown in FIG. 18, it may be also composed of a male threaded portion 24 provided on the outer periphery of the body section 6, more specifically, on the outer periphery of the lower body section 10, and a female threaded portion 23 which is provided on the lower portion of the inner surface 7c of the rotary section 7 for engagement with the male threaded portion 24. As a result, when the rotary section 7 is rotated and the male threaded portion 24 is screwed in the female threaded portion 23, the ball 8a serving as the engagement member 8 is engaged with the engagement portion 4k of the linking member 4. Therefore, the article 101 which is to be fixed can be fixed by a slight force to the fixture body 5 and to the fixture base 1 serving as a mounting object.

Figure 17:
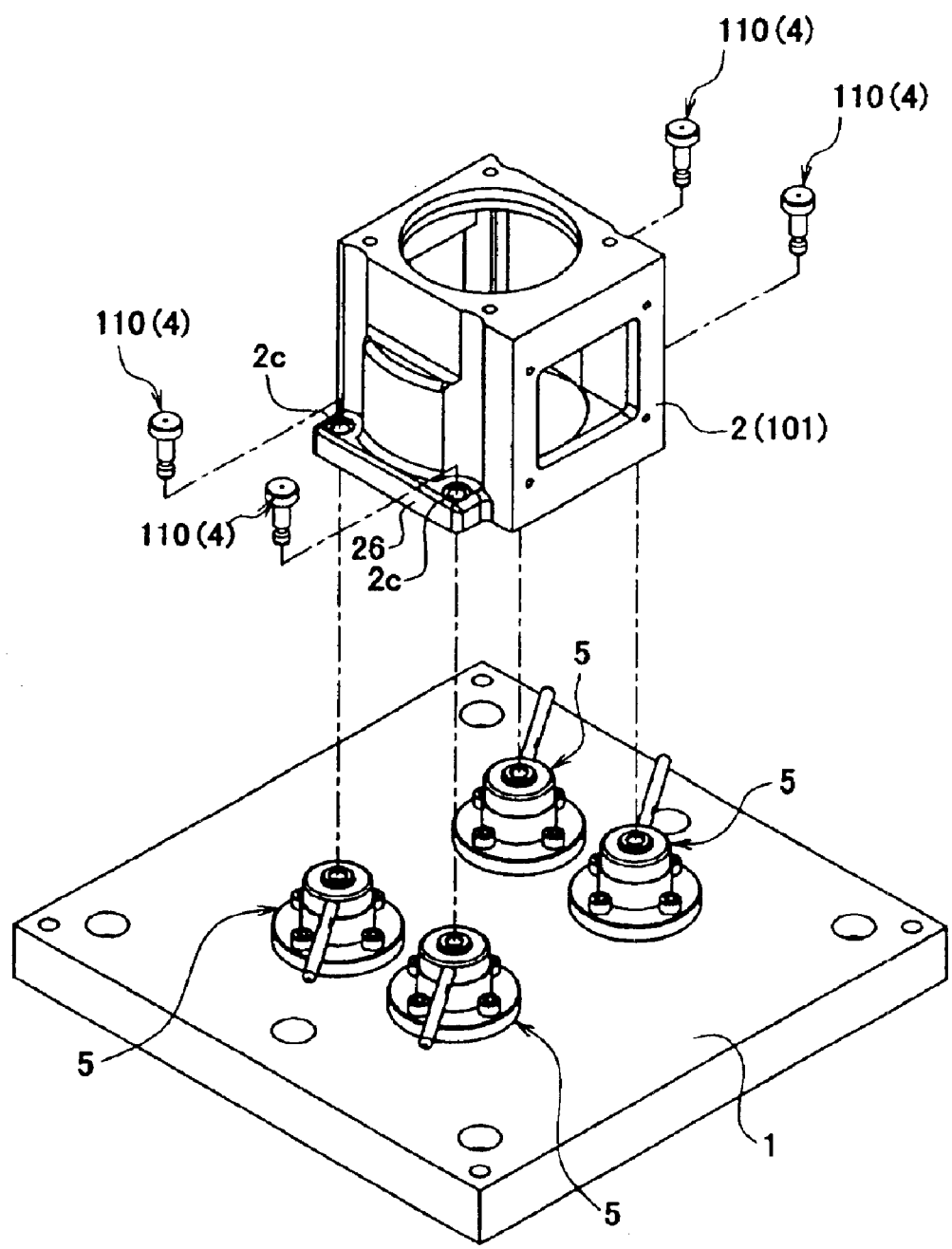
FIG. 17 is a perspective view illustrating a usage example of another embodiment of the fixture in accordance with the present invention.

Furthermore, the linking member 4 is not limited to the bolt member 107 mounted by screwing on the article 101 to be fixed. Thus, as shown in FIG. 17 and FIG. 18, the article 101 which is to be fixed comprises mounting portions 26 on both sides of the lower portion thereof, and mounting holes 2c, 2c passing through in the vertical direction are provided in those mounting portions 26. In the present embodiment, the linking member 4 is composed of a pin member 110 which is inserted from above into the mounting hole 2c and mounted on the aforementioned mounting portion 26. More specifically, for example, at one end of a shaft portion of the pin member 110 passing though the mounting hole 2c, that is, at the base end portion thereof, there is provided an engagement portion 4d serving as a portion 34 which is to be mounted and which cannot pass through the mounting hole 2c because the diameter thereof is larger than the diameter of the mounting hole 2c, and the pin member 110 can be detachably mounted on the workpiece 2, which is the article 101 to be fixed, by inserting the pin member 110 into the mounting hole 2c so that this engagement portion 4d is engaged with the engagement surface 27 that was formed on the upper surface of the mounting portion 26, for example, by counter sinking. It goes without saying that part of the upper surface of the mounting portion 26 can function as-is as the aforementioned engagement surface 27, without counter sinking the upper surface of the mounting portion 26.

Further, the lower surface 4b of the depression 4a of the linking member 4 is not necessarily an inclined surface and may be a horizontal surface, as shown in FIG. 18. In this case, the corner portion formed by the boundary of the aforementioned lower surface 4b and the outer periphery of the shaft of the linking member 4 becomes the engagement portion 4k which is engaged with the engagement member 8. Moreover, no specific limitation is placed on the shape or structure of the depression 4a of the linking member 4. Thus, the depression is not necessarily a groove-like depression provided over the entire outer periphery of the shaft of the linking member 4 and may, for example, be a curved depression provided on the outer periphery of the shaft.

Further, the article 101 which is to be fixed may be an article other than a workpiece, for example, a jig, a mounting tool, or a die. Furthermore, the linking member 4 may be, for example, a member provided at the article 101, which is mounted, for example, on a jig, a mounting tool, or a die as the article 101, or integrated therewith, and the article 101 may be fixed to the mounting object via this linking member 4.

Further, the engagement member 8 is not necessarily a ball 8a, and no specific limitation is placed on the shape thereof. Moreover, three engagement members 8 were equidistantly provided in the circumferential direction of the body section 6, but the number thereof is not limited to three, and one, two, four, or more such engagement members may be provided.

Further, the protruding portion 102 was provided in the central position on the bottom surface side of the body section 6, but it may be also provided in a position other than the central position or may not be provided at all. Moreover, it is also not necessary to provide the air release orifice 12a which is linked to the insertion hole and passes so as to be open at the bottom surface side of the protrusion 102.

Figure 19:
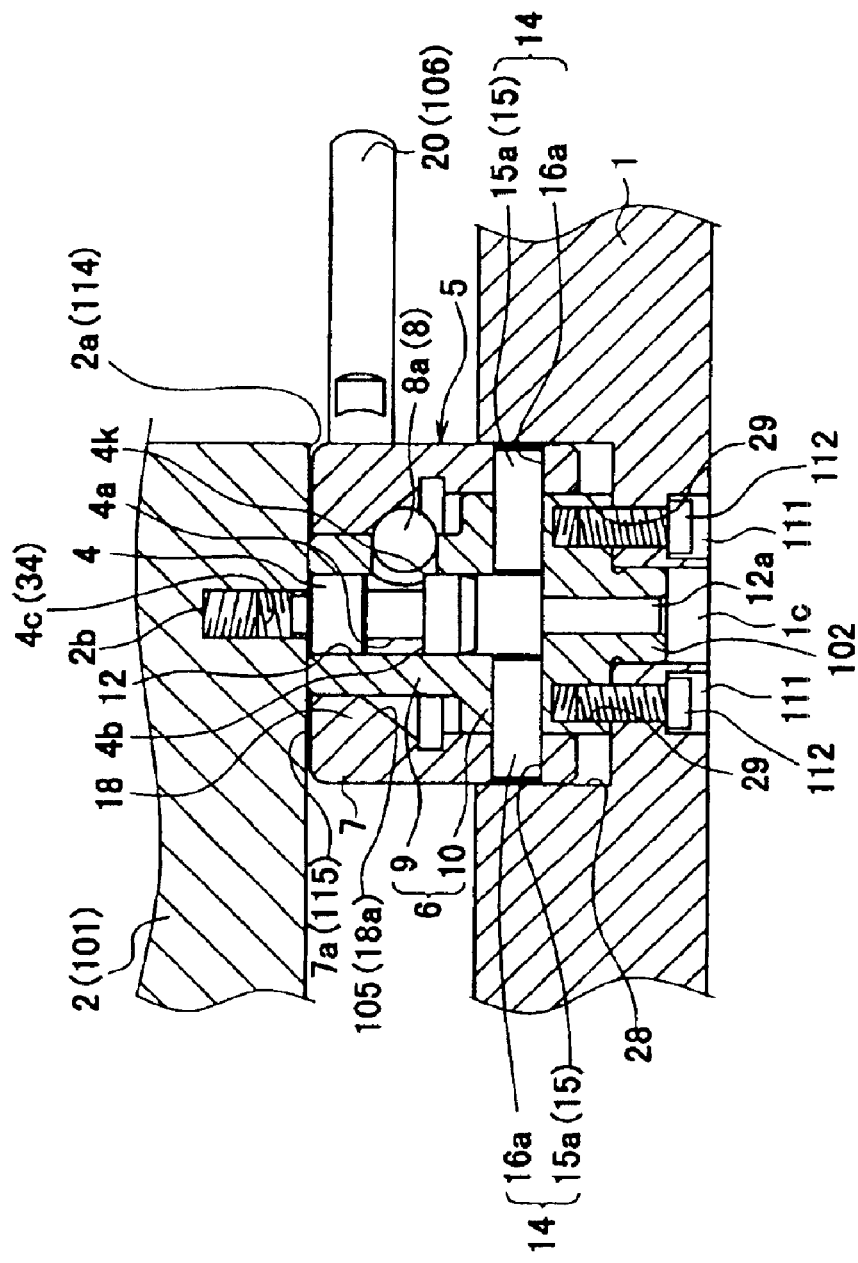
FIG. 19 is a view corresponding to FIG. 2 of yet another embodiment of the fixture in accordance with the present invention.

Further, the base portion 11 is not necessarily provided. Thus, for example, as shown in FIG. 19, the fixture body 5 can be detachably mounted on the mounting object with a threaded member which is screwed from the rear surface side of the mounting object. More specifically, an installation orifice 28 having a depth and a diameter allowing the fixture body 5 to be fit so that at least the guided protrusion 15 and the guiding groove 16 are hidden is provided in the fixture base 1 serving as a mounting object, and a plurality of bolt holes 111, 111 and positioning hole 1c linked to the installation orifice 28, open at the rear surface side of the fixture base 1, and composed of a through hole are formed in the fixture base 1 as a mounting object. On the other hand, a plurality of mounting orifices 29, 29 composed of threaded orifices are provided so as to sandwich the protruding portion 102 that will be inserted into the positioning hole 1c at the bottom surface side of the body section 6 of the fixture body 5, and those mounting orifices 29, 29 are provided so that they can be linked to the bolt holes 111, 111 when the fixture body 5 is fitted into the installation orifice 28. As a result the aforementioned fixture body 5 can be detachably mounted on the fixture base 1 by fitting the fixture body 5 into the installation orifice 28 and screwing the bolts 112, 112 as threaded members from the rear surface side of the fixture base 1 into the mounting orifices 29, 29 of the body section 6 via the bolt holes 111, 111

Figure 20:
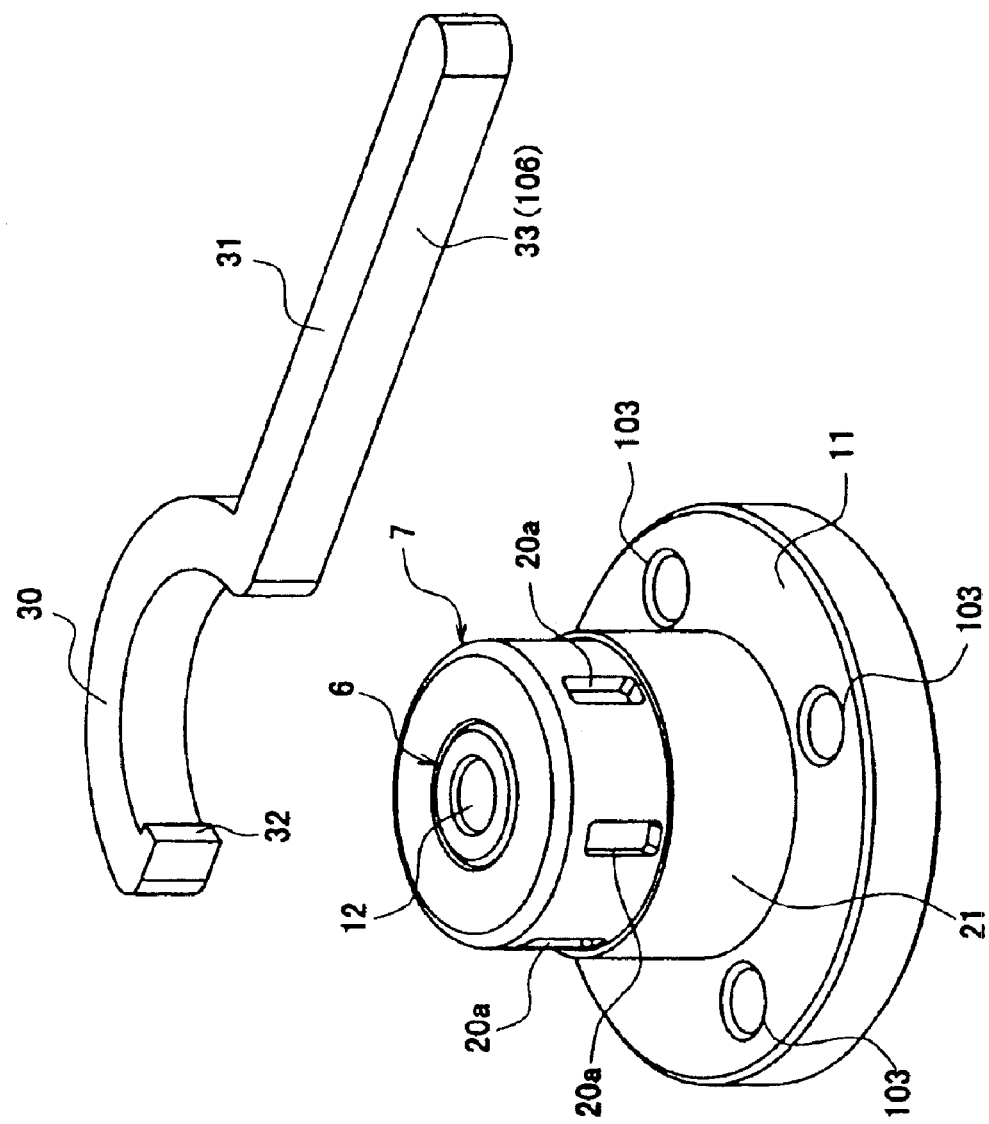
FIG. 20 is a perspective view of yet another embodiment of the fixture in accordance with the present invention.
Figure 21:
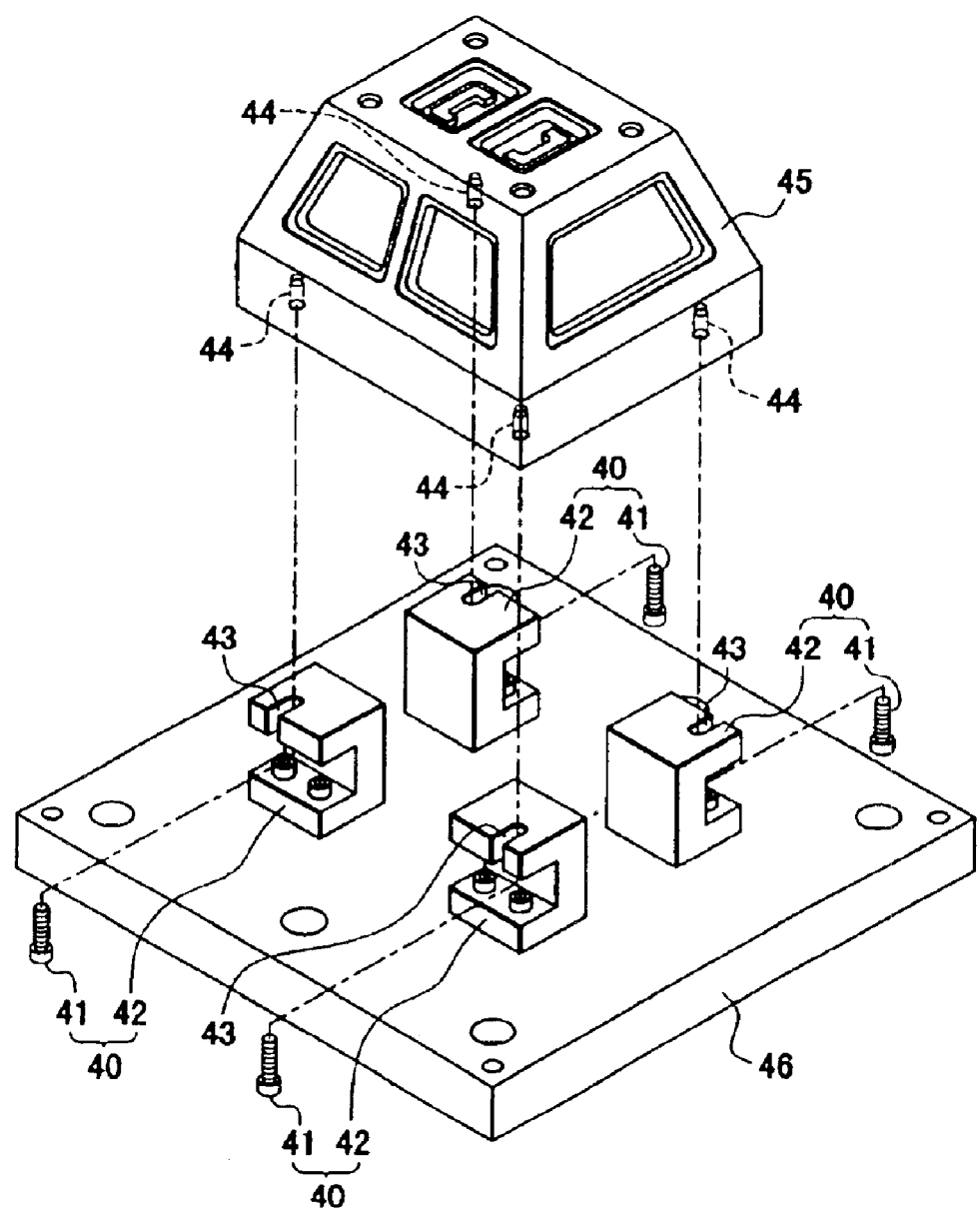
FIG. 21 is a perspective view illustrating a usage example of the conventional fixture.

Further, the operation member 106 detachably mounted on the rotary section 7 is not limited to the lever 20 described in the first embodiment. Thus, as shown in FIG. 20, the operation member 106 may be a special tool 33 composed of an installation portion 30 in the form of a circular arc curved so as to follow tightly the outer peripheral surface of the rotary section 7 and a rod-like handle 31 and equipped with a convex latch portion 32 at the distal end of the installation portion 30. Further, a plurality of concave catch portions 20a onto which the latch portion 32 of the operation member 106 is to be latched are provided in the circumferential direction of the upper portion of the outer peripheral portion of the rotary section 7. As a result, the special tool 33 serving as the operation member 106 may be mounted by latching the latch portion 32 onto the catch portion 20a and the rotary section 7 may be rotated by manual operations. In this case, when the catch portion 20a located in the appropriate position in the circumferential direction of the rotary section 7 is selected, the operation portion 106 can be rotary operated, while avoiding the interference of the operation portion 106 with a jig, a mounting tool, or other members. Furthermore, the shape of the outer surface of the rotary section 7 is not limited to a round cross-sectional shape and may have a quadrangular cross-sectional shape or a polygonal, e.g., hexagonal, shape. In this case, the rotary operation of the rotary section 7 can be carried out by using a wrench or other well-known tool. Therefore, it is not necessary to provide the operation member 106 at the rotary section 7.

Further, in the second and third embodiments, the fixture body 5 was mounted on the horizontal surface that was the surface of the fixture base 1, but it is not necessarily mounted on the horizontal surface and may be mounted, for example, on a vertical surface which is a side surface of the fixture base 1 composed, for example, of a tetrahedral block. Furthermore, it may be mounted on the inclined surface of a mounting object having an inclined surface. Thus, the direction of fixing and unfixing the article 101 to be fixed and the fixture 3 is not necessarily a vertical direction and may be a horizontal direction or an inclined direction. Furthermore, the fixture base 1 was provided with positioning holes 1a, 1a, but if the protruding portion 102 is not formed on the fixture body 5, it is not necessary to provide the positioning holes 1a.

What is claimed is:

1. A fixture for fixing an article to be fixed, to a mounting object via a linking member provided on the article to be fixed, said fixture comprising
   a fixture body detachably mounted on said mounting object,
   said fixture body comprising a body section having formed therein an insertion hole into which said linking member is to be inserted, a rotary section which is rotatably fitted onto the body section so as to cover an outer peripheral portion thereof, a through hole formed in the outer peripheral portion of the body section, and an engagement member protruding into said insertion hole via the through hole for engagement with said linking member, and
   at an inner surface of said rotary section, a pushing portion which pushes said engagement member so as to cause it to protrude into said insertion hole, following rotation of the rotary section thereof.

2. A fixture for fixing an article to be fixed, to a mounting object, said fixture comprising
   a fixture body detachably mounted on said mounting object,
   said fixture body comprising a body section having formed therein an insertion hole into which a linking member detachably mounted on said article to be fixed is to be inserted, a rotary section which is rotatably fitted onto the body section so as to cover the outer peripheral portion thereof, a through hole formed in the outer peripheral potion of the body section, and an engagement member protruding into said insertion hole via the through hole for engagement with said linking member, and at an inner surface of said rotary section, a pushing portion which pushes said engagement member so as to cause it to protrude into said insertion hole, following the rotation of the rotary section thereof.

3. The fixture according to claim 1 or 2, wherein said engagement member engages with said linking member so that a pull-out force acting in a lengthwise direction of said insertion hole is applied to said linking member.

4. The fixture according to claim 1 or 2, wherein a distal end surface of said body section protrudes to the outside beyond a distal end surface of said rotary section.

5. The fixture according to claim 1 or 2, wherein said fixture body comprises a transmission element which causes the rotary section to move in an axial direction thereof following the rotation of said rotary section, and said pushing portion pushes said engagement member so that it is caused to protrude into said insertion hole, as said rotary section moves in one said axial direction.

6. The fixture according to claim 5, wherein said transmission element is comprised of a male threaded portion at said body section and a female threaded portion in said rotary section for engagement with said male threaded portion.

7. The fixture according to claim 5, wherein said transmission element is comprised of a guiding surface provided on either said body section and said rotary section and a guided protrusion which is provided on the other of said body section and said rotary section and is guided with respect to said guiding surface.

8. The fixture according to claim 5, wherein said engagement member comprises a ball, and said pushing portion comprises an inclined surface inclined so as to withdraw from said axis along one said axial direction.

9. The fixture according to claim 1 or 2, wherein a protruding portion for insertion into a positioning hole in said mounting object is formed in a bottom surface portion of said body section.

10. The fixture according to claim 1 or 2, wherein an air release hole linked to said insertion hole and passing so as to open at a bottom surface side of said body section is formed in said body section.

11. The fixture according to claim 1 or 2, wherein a base portion in the form of a flange is provided at said body section, and said fixture body is detachably mounted on said mounting object with a threaded member passing into the base portion.

12. The fixture according to claim 1 or 2, wherein an operation member for manual rotary operation is mounted on said rotary section.

* * * * *